(12) United States Patent
McCoy et al.

(10) Patent No.: US 10,380,702 B2
(45) Date of Patent: *Aug. 13, 2019

(54) RIGHTS TRANSFERS USING BLOCK CHAIN TRANSACTIONS

(71) Applicant: Monegraph, Inc., New York, NY (US)

(72) Inventors: Kevin McCoy, Brooklyn, NY (US); Christopher Tse, Long Island City, NY (US); Hassan Abdel-Rahaman, New York, NY (US)

(73) Assignee: Monegraph, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,586

(22) Filed: Dec. 30, 2015

(65) Prior Publication Data

US 2016/0323109 A1    Nov. 3, 2016

Related U.S. Application Data

(60) Provisional application No. 62/169,263, filed on Jun. 1, 2015, provisional application No. 62/155,833, filed on May 1, 2015.

(51) Int. Cl.
| | |
|---|---|
| *G06F 21/00* | (2013.01) |
| *G06Q 50/00* | (2012.01) |
| *G06Q 50/18* | (2012.01) |
| *G06Q 30/00* | (2012.01) |
| *G06Q 20/06* | (2012.01) |
| *G06Q 20/12* | (2012.01) |
| *H04L 9/32* | (2006.01) |

(52) U.S. Cl.
CPC .......... *G06Q 50/01* (2013.01); *G06Q 20/065* (2013.01); *G06Q 20/1235* (2013.01); *G06Q 30/018* (2013.01); *G06Q 30/0185* (2013.01); *G06Q 50/184* (2013.01); *H04L 9/3239* (2013.01); *G06Q 2220/18* (2013.01); *H04L 2209/60* (2013.01)

(58) Field of Classification Search
CPC ...................................................... H04L 9/3239
See application file for complete search history.

(56) References Cited

U.S. PATENT DOCUMENTS

| | | | | |
|---|---|---|---|---|
| 2007/0226807 | A1* | 9/2007 | Ginter ..................... | G06F 21/10 726/27 |
| 2016/0035054 | A1* | 2/2016 | Branscomb ............. | H04L 9/088 705/316 |
| 2016/0098723 | A1* | 4/2016 | Feeney .............. | G06Q 20/4016 705/75 |
| 2016/0203572 | A1* | 7/2016 | McConaghy ........... | G06F 21/10 705/58 |
| 2016/0300234 | A1* | 10/2016 | Moss-Pultz ........ | G06Q 20/3829 |
| 2016/0323109 | A1* | 11/2016 | McCoy ................ | G06Q 50/184 |
| 2017/0091750 | A1* | 3/2017 | Maim .................. | G06Q 20/223 |

OTHER PUBLICATIONS

V Buterin, "A next-generation smart contract and decentralized application platform", 2014, cryptorating.edu (Year: 2014).*

* cited by examiner

*Primary Examiner* — Morshed Mehedi
(74) *Attorney, Agent, or Firm* — Perkins Coie LLP

(57) ABSTRACT

Systems and methods for managing media, such as digital content, using block chain technology are described. In some embodiments, the systems and methods perform multiple digital currency transfers between address nodes to register a collection of rights to a digital content item to a block chain, and perform a digital currency transfer transaction between address nodes to register the collection of rights to the block chain.

13 Claims, 28 Drawing Sheets

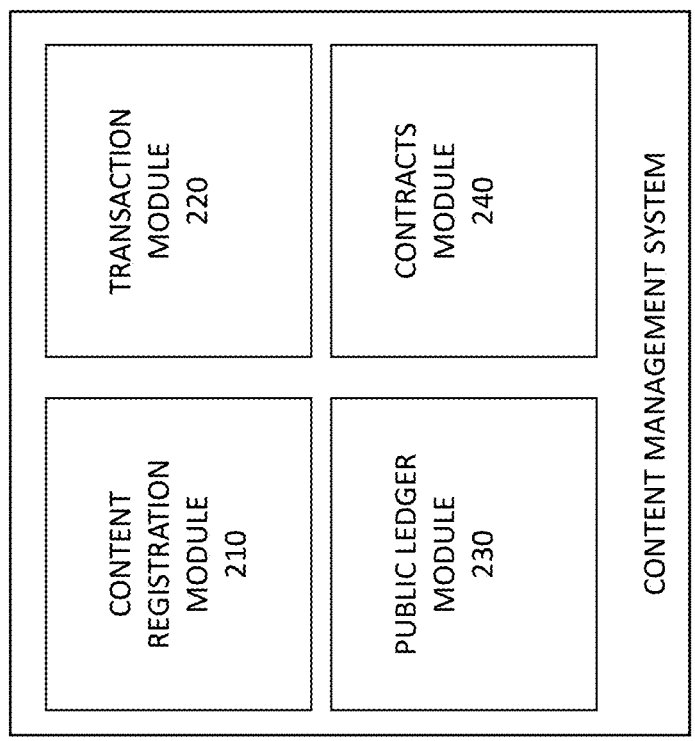
FIG. 2

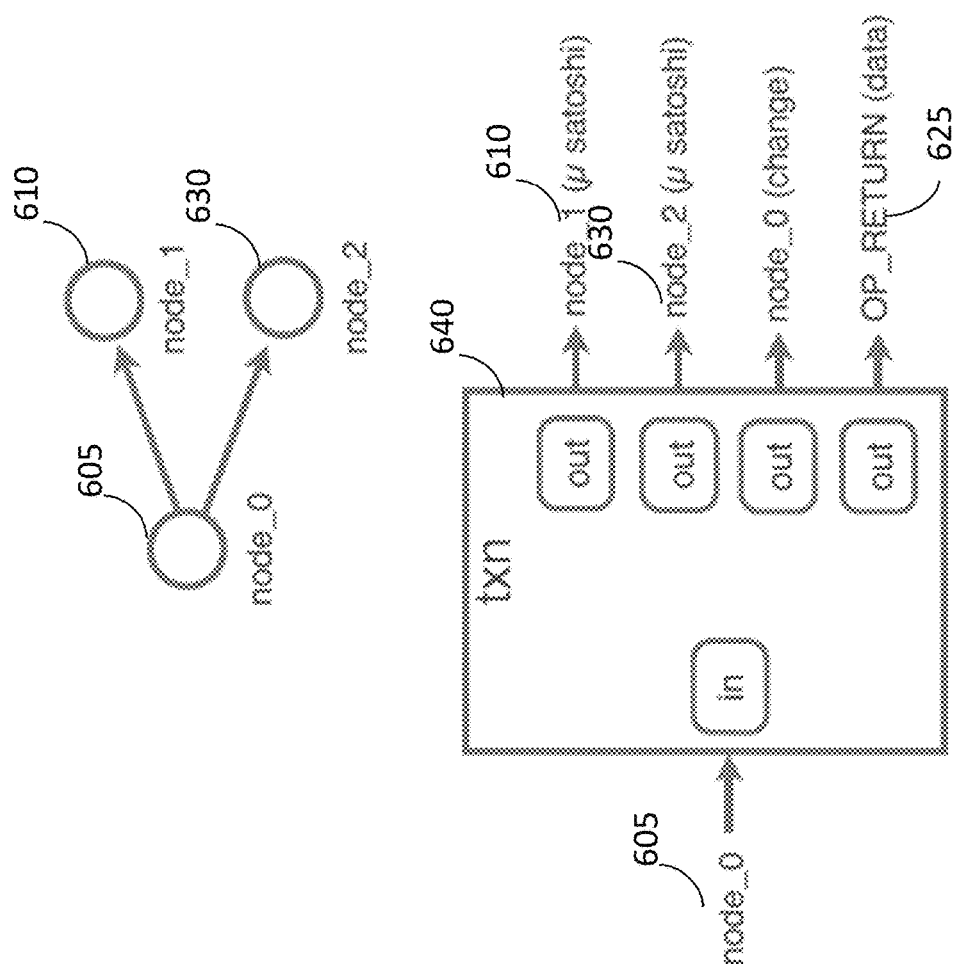

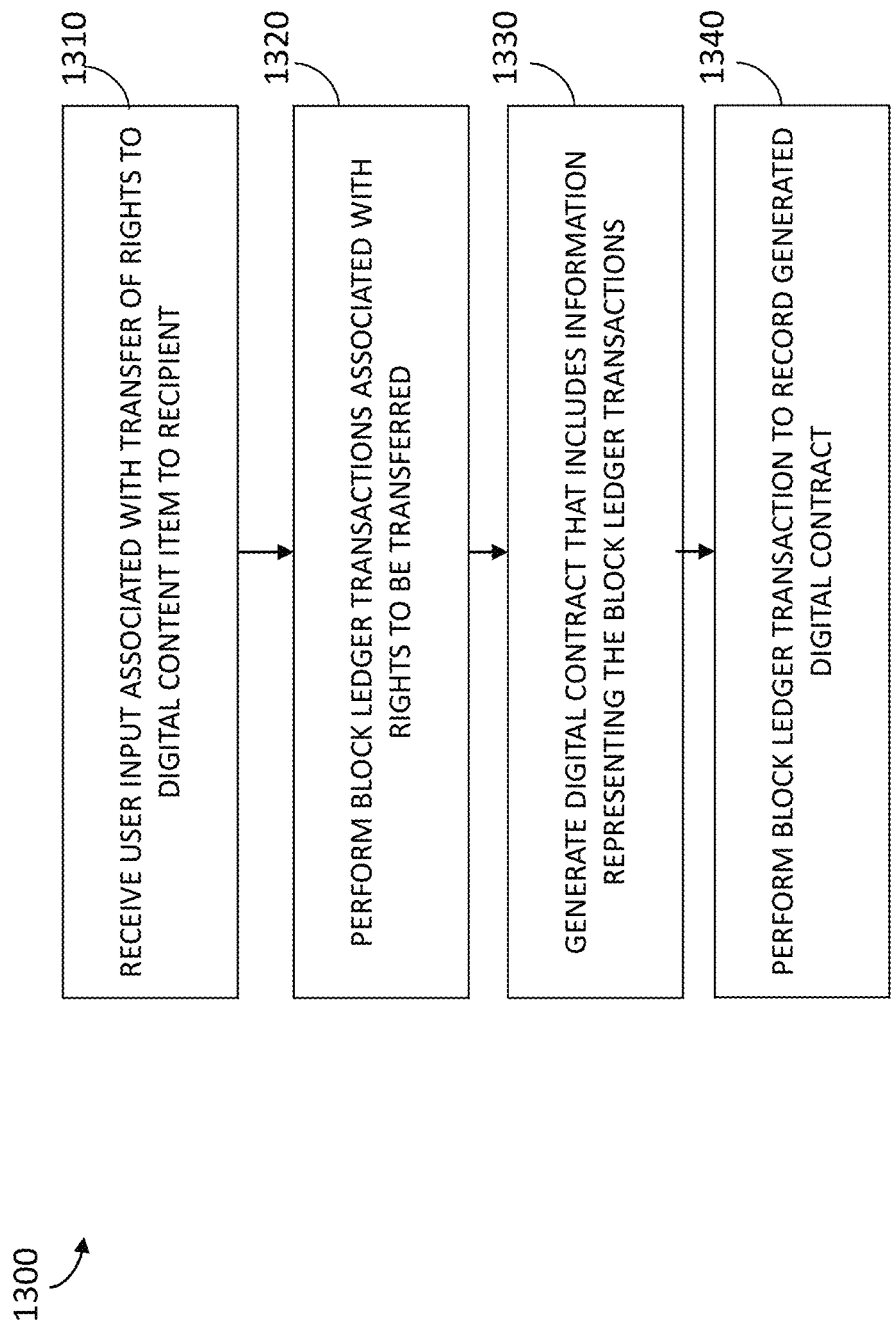

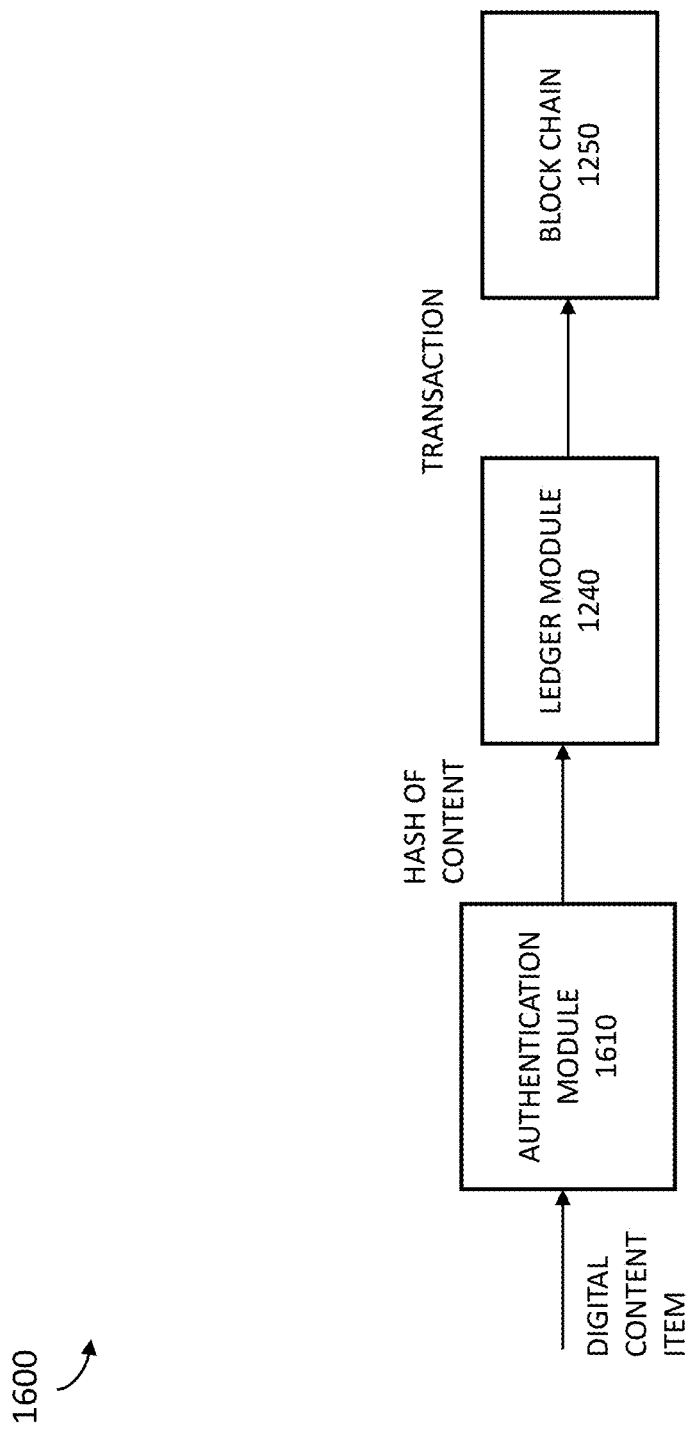

RIGHTS TRANSFERS USING BLOCK CHAIN TRANSACTIONS

CROSS REFERENCE TO RELATED APPLICATIONS

This application claims the benefit of U.S. Provisional Patent Application No. 62/155,833, filed on May 1, 2015, entitled MANAGEMENT OF MEDIA USING BLOCK CHAIN SYSTEMS, and U.S. Provisional Patent Application No. 62/169,263, filed on Jun. 1, 2015, entitled PERFORMING RIGHTS TRANSACTIONS USING BLOCK CHAIN SYSTEMS, which are hereby incorporated by reference in their entirety.

This application is related to U.S. patent application Ser. No. 14/867,772, filed on Sep. 28, 2015, entitled DIGITAL CONTENT RIGHTS TRANSACTIONS USING BLOCK CHAIN SYSTEMS, which is hereby incorporated by reference in its entirety.

BACKGROUND

A block chain is a distributed database that includes and maintains an ever growing list of data records. Being distributed, the block chain is effectively tamper and revision proof. There are many applications for a block chain, including the public ledgers of transactions for cryptocurrencies, such as bitcoin, name-coin, and so on. For example, the block chain enables decentralized digital currencies, because bitcoin transactions are verified by network nodes (e.g., addresses), and recorded in the public, distributed ledgers.

BRIEF DESCRIPTION OF THE DRAWINGS

Various embodiments are disclosed in the following detailed description and accompanying drawings.

FIG. 2 is a block diagram illustrating components of a content management system.

FIGS. 6A-6B are schematic diagrams illustrating a transfer of digital currency during a rights transaction for digital content.

FIG. 13 is a flow diagram illustrating a method for generating a digital contract of rights to a digital content item.

FIG. 16 is a block diagram illustrating interactions between components during the authentication of a newly registered digital content item.

DETAILED DESCRIPTION

Overview

The use and distribution of digital content, such as digital documents, images, multimedia, and so on, has historically been difficult to track, control and/or protect by owners of the digital content, especially online. For example, social networks, messaging, micro-blogs, and so on, provide easy mechanisms for users to view, share, and appropriate content provided by others. Content creators and owners, therefore, often face problems when attempting to assert the ownership of their works and, in some cases, license or receive remuneration for the use of their works by others.

Systems and methods for managing media, such as digital content, using block chain technology are described. In some embodiments, the systems and methods provide block chain-based attribution and authentication to creators of media and other digital content. For example, the systems and methods may provide distribution channels for digital content, using social media networks and other networks, smart contract execution environments for regulating usage and payments of fees and royalties for use of digital content, systems for content and/or rights exchange, block chain-based media usage metering, rights transactions and payment completion services, and so on.

In some example embodiments, the systems and methods generate a digital contract for rights to a digital content item using an input module that receives input associated with transferring rights of a digital content item to a recipient, a transaction module that performs one or more block chain transactions to register each right of the digital content item to transfer to the recipient to a public ledger, and a contract module that performs a block chain transaction to register a digital contract that includes information representing each of the performed one or more block chain transactions to the public ledger.

For example, the systems and methods perform multiple digital currency transfers between address nodes to register a collection of rights to a digital content item to a block chain, and perform a digital currency transfer transaction between address nodes to register the collection of rights to the block chain.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and the equivalent.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Suitable Computing Environment

Figure 1:
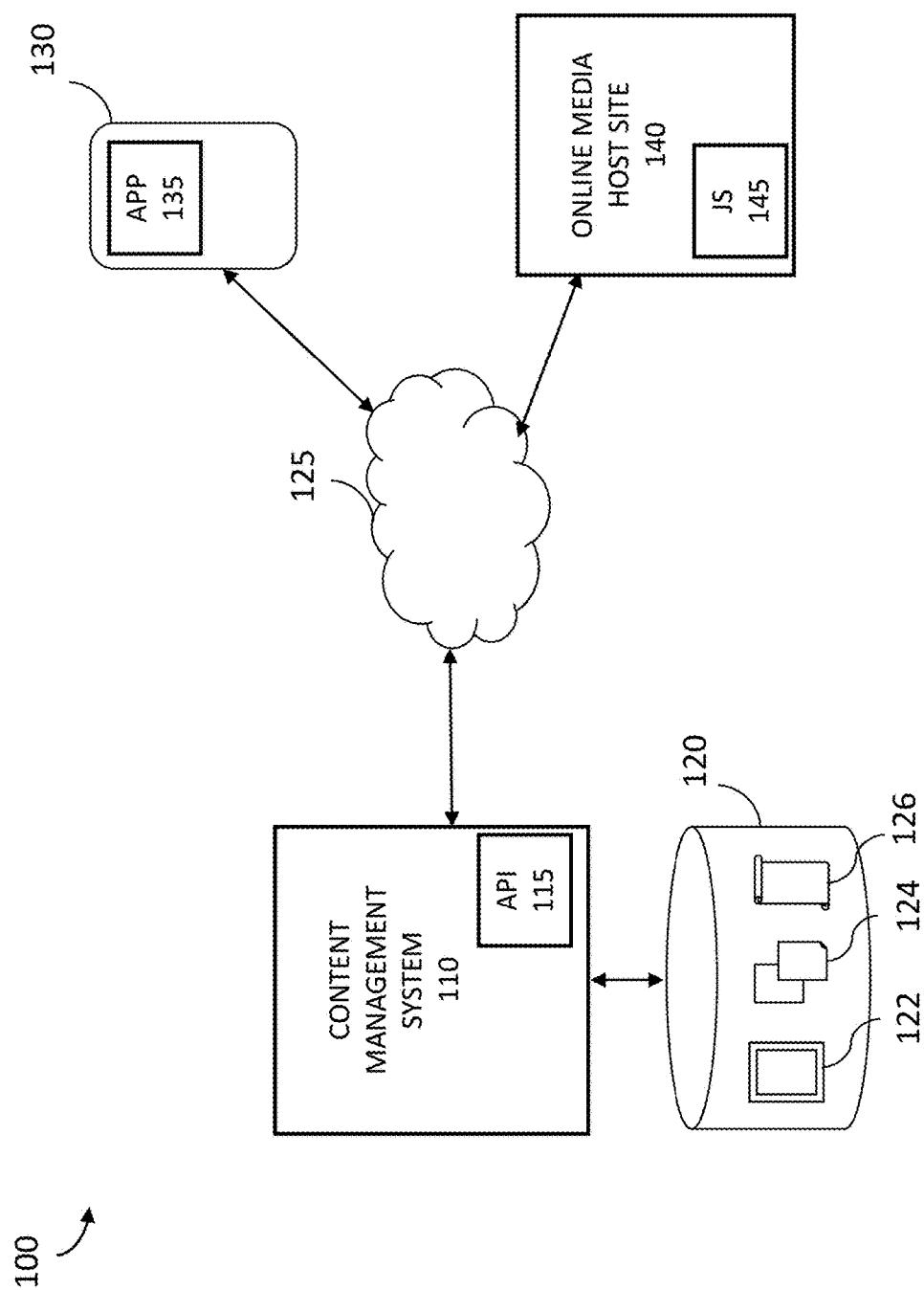
FIG. 1 is a block diagram illustrating a suitable computing environment for performing transactions associated with digital content.

FIG. 1 is a block diagram illustrating a suitable computing environment 100 via which to manage media using block chains. The computing environment 100 includes a content management system 110, which provides an Application Programming Interface (API) service 115 and/or via deployable software (local or cloud-based) configured to enable users, customers, enterprise systems, and so on, to access various different media management functions provided by the content management system 110. For example, a user at a computing device 130 (such as a mobile device, laptop, and so on) may upload, over a network 125 (e.g., the Internet), such as via a mobile application 135, content to an online media host site 140 that supports a website or service that presents content to users.

The online host media site 140 may contain various different scripts or modules, such as a javascript module 145, that facilitate communicating over the network 125 to the content management system 110 (e.g., calling the API 115), in order to access and retrieve certain information associated with the uploaded content, such as rights information, ownership information, licensing or purchasing information, unique identifiers, provenance information, and so on. The content management system 110 may store such information via block-chain technology in various databases or memory, either local to the system or in various cloud-based storage services.

For example, a database 120 may include content information 122 associated with digital content items, such as information describing the digital content items, information representing the content items (e.g., hash values that represent the digital content items), metadata associated with the digital content items, and so on. The database 120 may also include contract data or information 124, such as information associated with rights assigned to the digital content items and/or use of the digital content items, and one or more public ledgers, such as block chains associated with the digital content items that track transactions performed with respect to the digital content items.

Of course, the database 120 may include other types of data or information, such as user information (e.g., information associated with owners or recipients of content), payment information (e.g., information associated with monetary exchanges for content), online host information (e.g., information associated with various online hosts of content, such as host site 140), and so on.

As described herein, the content management system 110 may include various components that perform digital currency transactions in order to establish the transfer of rights of digital content between entities (e.g., between a content owner/provider and a content acquirer/recipient) and generate, create, update, or otherwise maintain public ledgers of the performed transactions, such as distributed public ledgers for the digital content.

Further details regarding the components and methods performed by the content management system 110, and other associated systems, are described in the following section (and elsewhere).

Examples of Managing Digital Content Using Block Chain Technology

As described herein, the systems and methods utilize various aspects of block-chain technology to manage the attribution, appropriation, distribution, transfer, and other actions associated with digital media (e.g., text-based content, audio-based content, video-based content, image-based content, and so on) and/or rights to the media (e.g., represented by contracts), such as user-created content that is presented to other users via various different online environments, such as websites, social networks, blogs, microblogs, and so on.

FIG. 2 is a block diagram illustrating components of the content management system 110. The content management system 110 may include one or more modules and/or components to perform operations for managing the use of digital content and/or rights to the use of the digital content. The modules and/or components may be hardware, software, or a combination of hardware and software, and may be executed by one or more processors. For example, the content management system 110 may include a content registration module 210, a transaction module 220, and a public ledger module 230.

In some embodiments, the content registration module 210 is configured and/or programmed to register digital content items received from owners of the digital content items. For example, the content registration module 210 may include a content input component that is configured to receive input from the owners of the digital content items, wherein the input includes digital content items provided to an online website (e.g., via mobile application 135 or via host site 140) to be displayed by the online website, and information identifying rights to be assigned to use of the digital content items.

In some embodiments, the transaction module 220 is configured and/or programmed to perform bitcoin or other digital currency transactions to generate public ledger entries that represent rights transfers of the digital content items between providers and recipients. For example, the transaction module 220 may perform a transaction to transfer rights to a digital content item by transferring digital currency from a first node address associated with a current owner of rights to the digital content item to a second node address associated with a recipient of the rights to the digital content item. In some embodiments, the transfer of rights represents and/or activates a contractual clause or usage term(s) within an associate contract for a given piece of media or content.

In some embodiments, the public ledger module 230 is configured and/or programmed to maintain a public ledger of the generated public ledger entries for the registered digital content items. For example, the public ledger module 230 generates a block chain of transaction entries for each registered digital content item, such as a transaction entry representing the transfer of digital currency from a first node address associated with a current owner of rights to the digital content item to a second node address associated with a recipient of the rights to the digital content item.

In some embodiments, the content management system 110 may also include a contract module 240 that is configured and/or programmed to maintain contracts for registered digital content items. For example, the contract module 240 may access digital contracts for digital content items, such as contracts that include information identifying a right type for the digital content items, the node address (e.g., bitcoin address) for the rights assigned to the digital content items, and the owner (e.g., entity) that owns the rights to the digital content items.

In order to maintain the contracts, the contract module 240 may modify, amend, or change digital contracts that define the rights assigned to the digital content items in response to performed bitcoin transactions, wherein the digital contracts include information identifying right types for the rights assigned to the digital content items, information identifying bitcoin addresses associated with the rights assigned to the digital content items, and information identifying owners of the digital content items.

Therefore, the content management system 110 may manage the rights to registered digital content with the public ledger module or component 230, which generates a block chain of transaction entries for digital content, wherein each of the transaction entries represents a transfer of a right to digital content from a provider of the digital content to a recipient of the digital content, and the transaction module or component 220, which performs transactions to transfers rights of the digital content from providers to recipients, wherein the performed transactions include transfers of digital currency between bitcoin (or other digital currency) addresses associated with the providers of the digital content and bitcoin (or other digital currency) addresses associated with the recipients of the rights to the digit content.

As described herein, the content management system performs various methods and processes when tracking creation and ownership of digital content items, such as by utilizing digital currency transactions as representations of rights transfers between entities, and maintaining a list of such transactions as a chain of provenance for the digital content items in public ledgers and other block chains.

Figure 3:
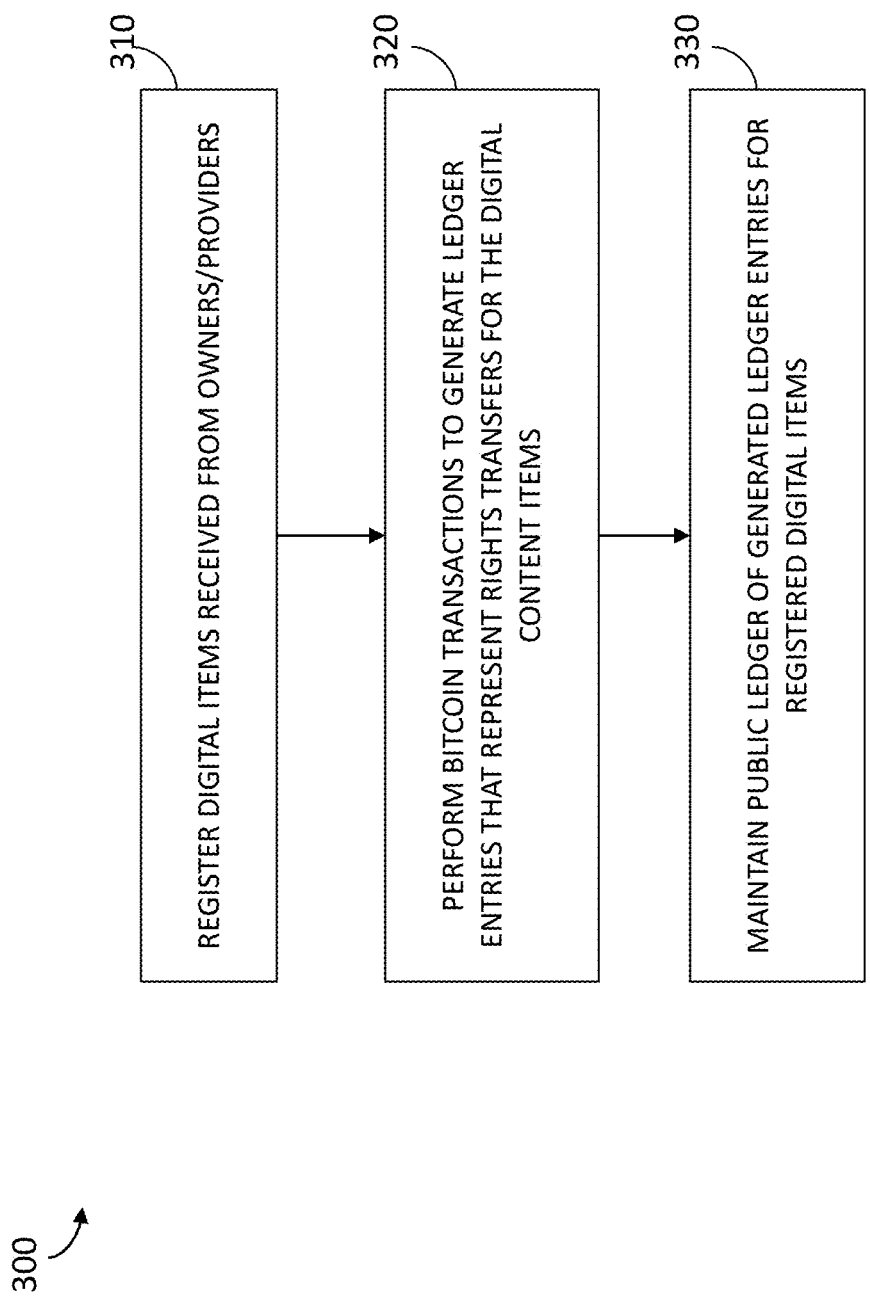
FIG. 3 is a flow diagram illustrating a method for managing the use of digital content.

FIG. 3 is a flow diagram illustrating a method 300 for managing the use of digital content. The method 300 may be performed by the content management system 300 and, accordingly, is described herein merely by way of reference thereto. It will be appreciated that the method 300 may be performed on any suitable hardware or devices/components within the content management system 110.

In operation 310, the content management system 110 registers digital content items received from owners of the digital content items (or, in some embodiments, registers placeholders or representations of offline, or non-digital content items). For example, the content registration module 210 may include a content input component that is configured to receive input from the owners of the digital content items, wherein the input includes digital content items provided to an online website (e.g., via mobile application 135 or via host site 140) to be displayed by the online website, and information identifying rights to be assigned to use of the digital content items.

In operation 320, the content management system 320 performs bitcoin (or other digital currency) transactions to generate public ledger entries that represent rights transfers of the digital content items between providers and recipients. For example, the transaction module 220 may perform a transaction to transfer rights to a digital content item by transferring digital currency from a first node address associated with a current owner of rights to the digital content item to a second node address associated with a recipient of the rights to the digital content item.

In operation 330, the content management system 330 maintains a public ledger of the generated public ledger entries for the registered digital content items. For example, the public ledger module 230 generates a block chain of transaction entries for each registered digital content item, such as a transaction entry representing the transfer of digital currency from a first node address associated with a current owner of rights to the digital content item to a second node address associated with a recipient of the rights to the digital content item.

As described herein, the content management system 330 performs various of types of digital currency transactions when establishing, creating, or transferring rights to digital content items for or between entities (e.g., for owners or between owners and recipients).

Figure 4:
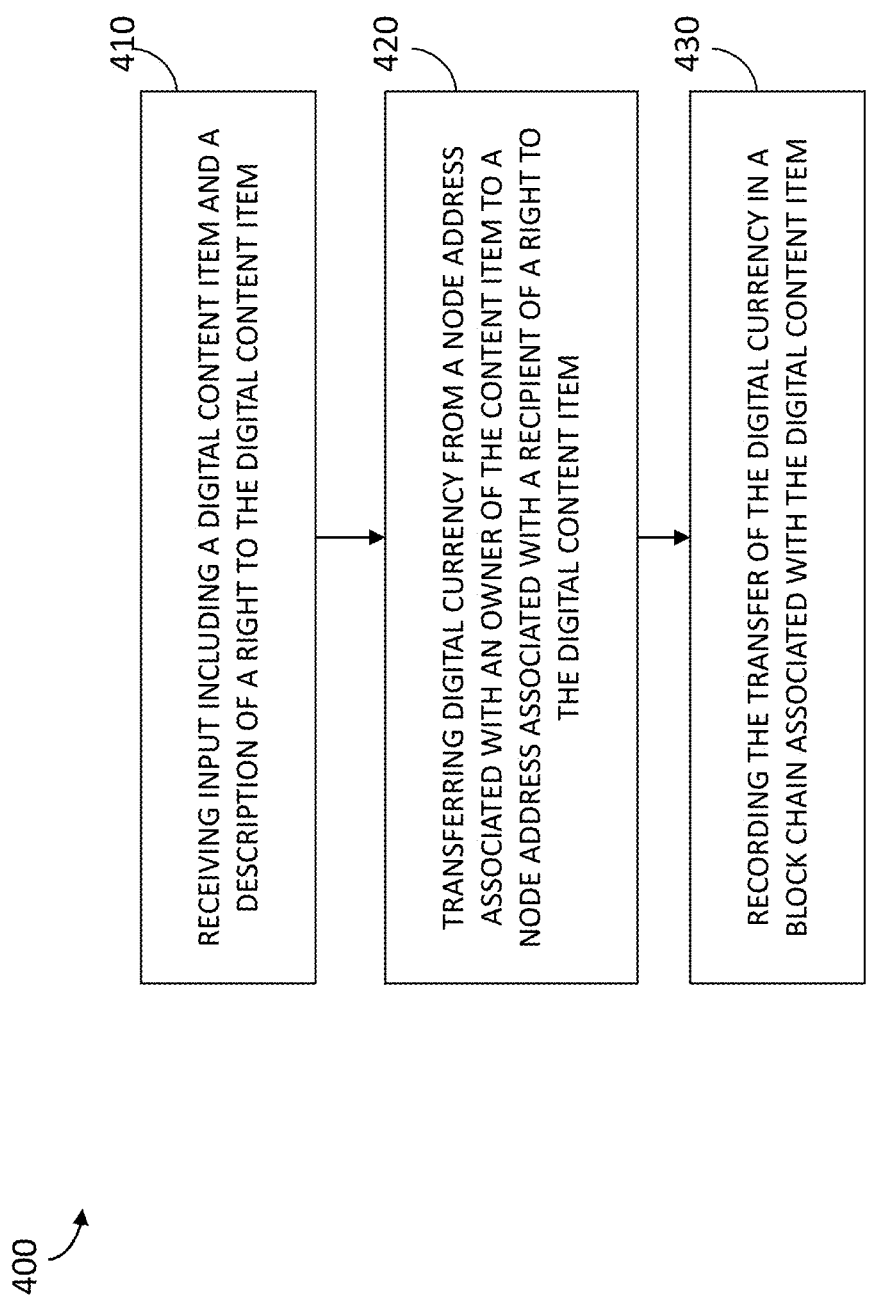
FIG. 4 is a flow diagram illustrating a method for transferring rights assigned to digital content between entities.

FIG. 4 is a flow diagram illustrating a method 400 for transferring rights assigned to digital content between entities. The method 400 may be performed by the content management system 400 and, accordingly, is described herein merely by way of reference thereto. It will be appreciated that the method 400 may be performed on any suitable hardware or devices/components within the content management system 110.

In operation 410, the content management system 110 registers a digital content item or items received from an owner or provider of the digital content. In some cases, during registration of a digital content item, the content management system 110, via the content registration module 210, may receive input from the owner that includes the digital content item and a description of the right to the digital content item to be provided to recipients, generate a parent, or first, address node as a bitcoin address that represents a right to be assigned to the digital content item or items (and, subsequently provided to recipients), and transfer digital currency from a rightbase, or any other input address controlled and maintained by the content management system 110, to the parent address node to create the right to the digital content item.

In operation 420, the content management system 110 transfers digital currency from a parent address node associated with an owner of a digital content item to a child address node associated with a recipient of a right to the digital content item. The transaction module 220 may perform various different transactions, based on a right type for the right assigned to the digital content item being transferred to the recipient. For example, the transaction module 220 may perform a complete transfer of rights from one entity to another, may provide a clone (or, copy) of rights to one or more entities, and so on.

For example, when performing a transfer of rights from one entity to another, the transaction module 220 receives input from the owner that includes a request to transfer the right to the digital content item to the recipient, generates the child address node as a bitcoin or other digital currency address that represents the recipient, and transfers digital currency from the parent address node to the child address node of the recipient.

As another example, when performing a transfer of a clone (or another instance) of rights to one or more entities, the transaction module 220 transfers digital currency from a rightbase to the parent address node to maintain the right to the digital content item for the owner, receives input from the owner that includes a request to provide a clone of the right to the digital content item to the recipient, and generates the child address node as a bitcoin address that represents the recipient. Thus, the transfer of the digital currency from the parent address node associated with the owner of the digital content item to the child address node associated with the recipient of the right to the digital content item provides the recipient with the clone of the right to the digital content item.

In order to avoid possible "double spending" of the digital currency associated with node addresses (where an address node performs multiple digital currency transfers to different entities, introducing uncertainty to the tracked provenance of digital content), the transaction module 220, during performed transactions, transfers an entire digital currency balance associated with a parent address node to the child address node.

Also, when performing digital currency transfers between address nodes, the transaction module 220 may attach data to one or more zero value outputs (e.g., OP_RETURN in bitcoin) provided by the scripting system during digital currency transactions. For example, the transaction module 220 may associate data to the transfer of the digital currency that includes information identifying a type of the right to the digital content item provided to the recipient and information associated with a digital contract that contains a description of the right to the digital content item provided to the recipient. Thus, the transaction record associated with the transaction may include, in addition to information identifying the transferring and receiving node addresses, data identifying the type of right and the contract representing the right to the digital content item.

In operation 430, the content management system 110 records the transfer of the digital currency from the parent address node to the child address node in a block chain associated with the digital content item. For example, the public ledger module 230 generates or updates a block chain of transaction entries for the digital content item, such as with a transaction entry representing the transfer of digital currency from the parent node address to the child node address.

For example, Table 1 is an example of a public ledger that tracks digital currency transfers as rights transactions for a digital content item:

the rights to the digital content item, the node address for the receiving entity, or new owner of the rights to the digital content item, and information identifying the contract that defines and/or represents the rights to the digital content item. Of course, Table 1 and Table 2 may include more or different information than what is depicted, such as information associated with the transaction, information associated with the digital content item, and so on.

Thus, the content management system 110 tracks the provenance of digital content items via a recordation of digital currency transactions between node addresses representing transferring and receiving entities on public ledgers.
Examples of Digital Currency Transactions as Rights Transfers As described herein, the content management system 110 utilizes digital currency transfers to validate and represent rights transfers between entities for digital content items. What follows are details regarding these digital currency transactions, and how they map to the transfers of rights between entities.

Figure 5:
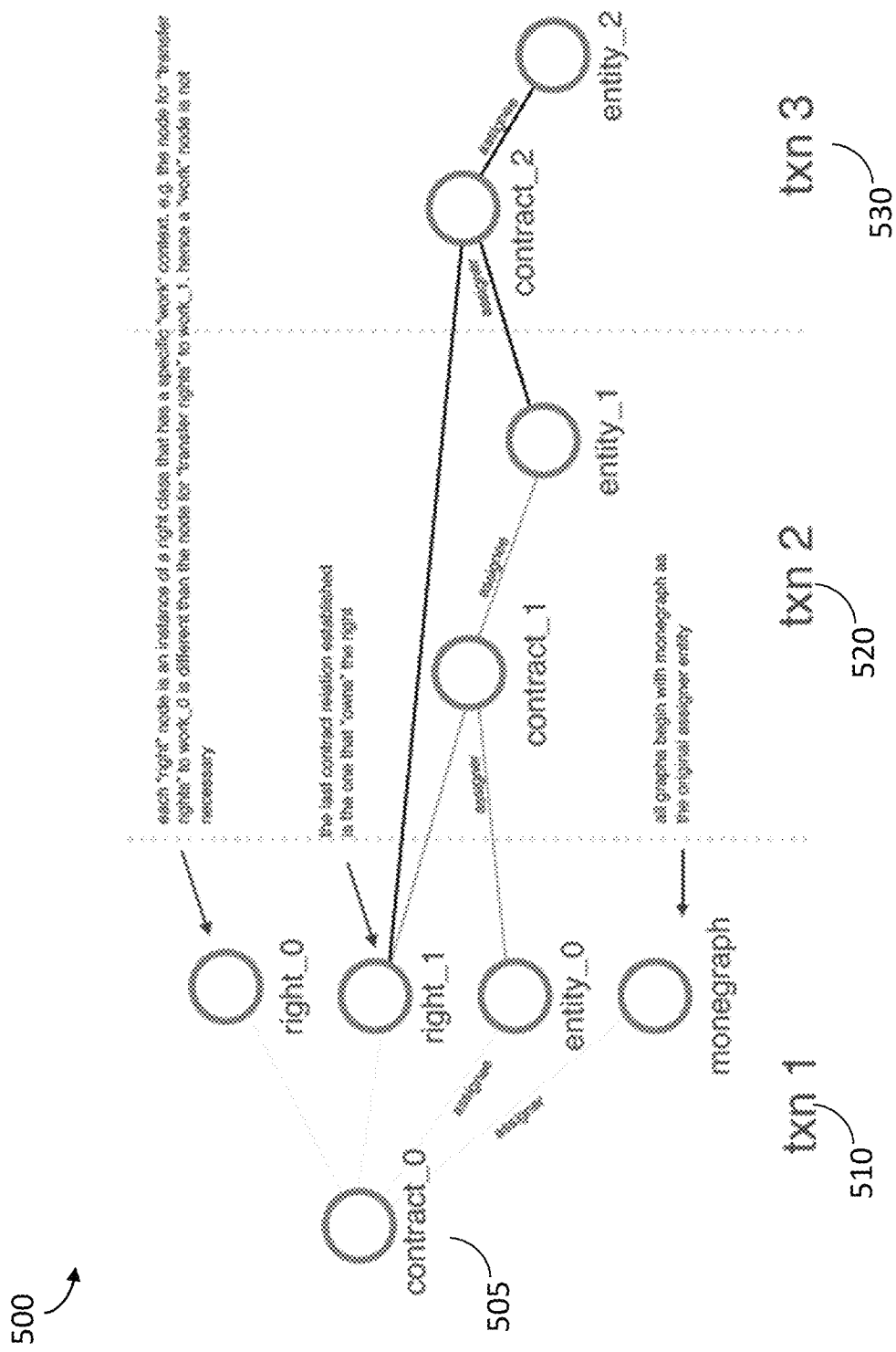
FIG. 5 is a schematic diagram illustrating a transfer of rights assigned to digital content between entities.

FIG. 5 is a schematic diagram 500 illustrating a transfer of rights assigned to digital content between entities. A first transaction 510 associated with a contract 505 (e.g., "contract_0") occurs when a common assignor entity ("monegraph", or the content management system 110) assigns the rights of a work ("right_1") to an entity ("entity_0"), such as a creator of a work newly registered to the content management system 110, while maintaining original rights ("right_0") to the work.

A rights transfer transaction 520 occurs when the assignor (entity_0) assigns the rights (right_1) represented by an updated contract ("contract_1") to a recipient entity ("entity_1"). A subsequent rights transfer transaction 530 occurs when the current owner of the rights to the work, "entity_1," assigns the rights (right_1) represented by an updated contract ("contract_2") to a second recipient entity ("entity_2").

Figure 6A:
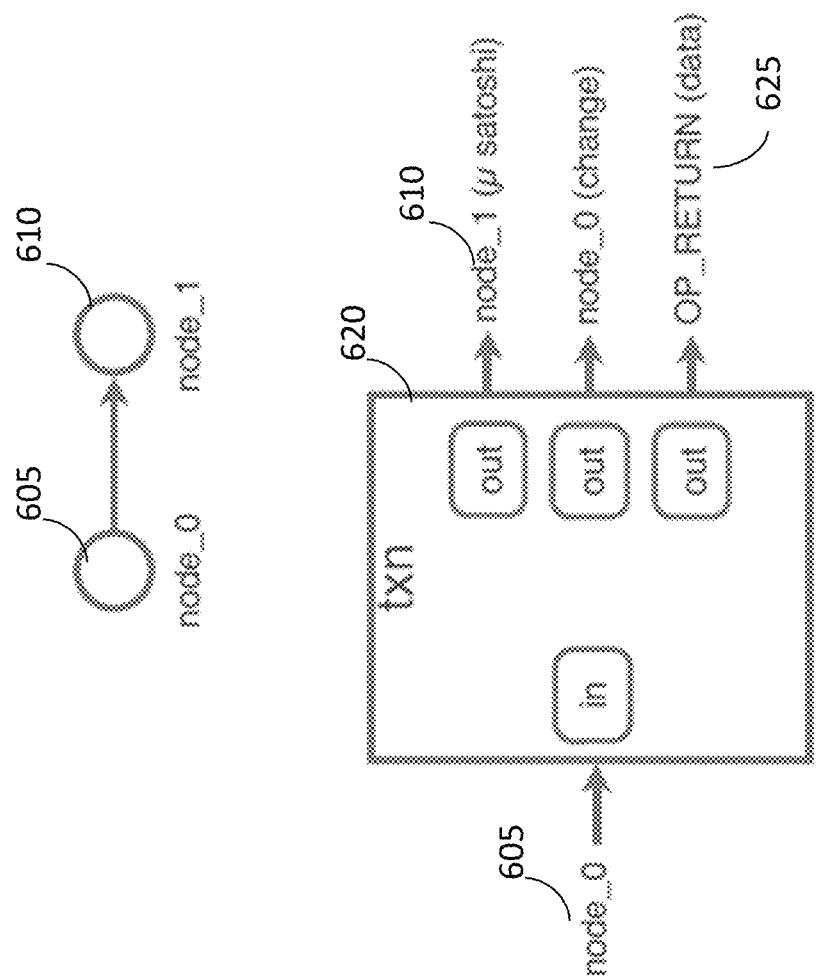

FIGS. 6A-6B are schematic diagrams illustrating a transfer of digital currency during a rights transaction (e.g.,

TABLE 1

| Date | Transaction |
|---|---|
| Jan. 1, 2015 | 29b33fc07a0192e9c1d50da2850f36bca946a8f047bf743719a62207ab85586b |
| Jan. 15, 2015 | 2850f36bca946a8f047bf743719a62207ab85586b29b33fc07a0192e9c1d50da |
| Mar. 20, 2015 | b0886fd9cf0322b0d6910040cbcf158c7bdd538952dd7a5a01bd892f8de6b6c8 |
| . . . | . . . |

As shown in Table 1, the transaction "29b33fc07a0192e9c1d50da2850f36bca946a8f047bf743719a62207ab85586b" represents an initial creation of rights for a newly registered digital content item, while transaction "2850f36bca946a8f047bf743719a62207ab85586b29b33fc07a0192e9c1d50da" represents a transfer of the rights to a second entity.

Following the example, Table 2 is an example of details associated with a currency transfer, such as the transaction that occurred on Jan. 1, 2015:

transactions 510, 520, and/or 530) for digital content. For example, FIG. 6A depicts a directed graph relationship where a parent node 605 asserts a relationship to a child node 610 by sending, or transferring, digital currency to the child node. For example, a transaction 620 occurs when the parent address node 605 transfers μ satoshi (or, some other small amount of digital currency) to the child address node 610. The transaction 620 also associates certain data/information (e.g., right type information, hash value representing

TABLE 2

| Transferring Entity | Receiving Entity | Contract |
|---|---|---|
| 1EwBV346uW9cGrzsZfFkdZfN3jNAhwG5Cr | 1GrgYzJMSgbLUtXRBQsViYrrmod1FxgYsjp | Contract_2 |

As shown in Table 2, the transaction details include the node address for the transferring entity, or former owner of a contract) to the transaction 620 via a zero value output (e.g., OP_RETURN 625).

As another example, FIG. 6B depicts a directed graph relationship where a parent node 605 asserts a relationship to multiple child nodes (e.g., node 610 and node 630) by sending, or transferring, digital currency to the child node. For example, a transaction 640 occurs when the parent address node 605 transfers µ satoshi (or, some other small amount of digital currency) to the child address node 610 and the child address node 630. The transaction 640 also associates certain data/information (e.g., right type information, hash value representing a contract) to the transaction 620 via a zero value output (e.g., OP_RETURN 625).

The content management system 110 may implement and/or follow certain rules or controls when performing transactions between nodes that represent entities. The content management system 110 controls an input address (e.g., "rightbase"), of which all transactions are based or derived. Rightbase may be, for example, a coinbase for rights, and serve to establish an initial right or rights by providing an initial address from which one or more transactions originate. The content management system 110, therefore creates a right for a digital content item (e.g., when the digital content item is registered into the system 110) by transferring µ satoshi from the rightbase to an address, now called a "right-address."

In some embodiments, therefore, right or rights transactions may only include "right-addresses" or rightbase as input addresses, and "right-addresses" or rightbase as output addresses. As described herein, when a right transaction occurs, all input addresses (except rightbase) may spend their entire unspent balance of digital currency. By causing all transactions to completely spend associated digital currency, the content management system 110 may prevent double spends on rights (where no change is given to a right-address (only rightbase can receive change).

In some embodiments, "satoshi pollution" may occur, where funds are transferred to a right-address that are non-rights related. The content management system 110 may mitigate such occurrences by generating right-addresses concurrently to when a right is transferred to an entity, and by transferring an entire balance associated with the right-address.

As described herein, a right transaction includes an OP_RETURN or other zero sum output, which includes an identification of the type of right being transferred, combined with a hash of a digital contract that describes the right. Therefore, the proof-of-existence for a right may be defined by a node address that has: (1) an unspent balance, and that is associated with transactions that contain an OP_RETURN output that includes a right type identifier and a hash value representing a digital contractual document that describes the right (e.g., an open digital rights language, or ODRL, document). Thus, transactions for a "right-address" may be traced back to a transaction initiated by rightbase.

When a digital content item is registered with the content management system 110, the system 110 creates a bitcoin or other node address to represent a contract that defines the right assigned to the digital content item, and a node address for every right to be established and assigned to the digital content item. These are called "created rights." Once created, the content management system 110 transfers, for example, µ satoshi from rightbase to each of the created rights addresses, along with data attached via an OP_RETURN output.

Figure 7:
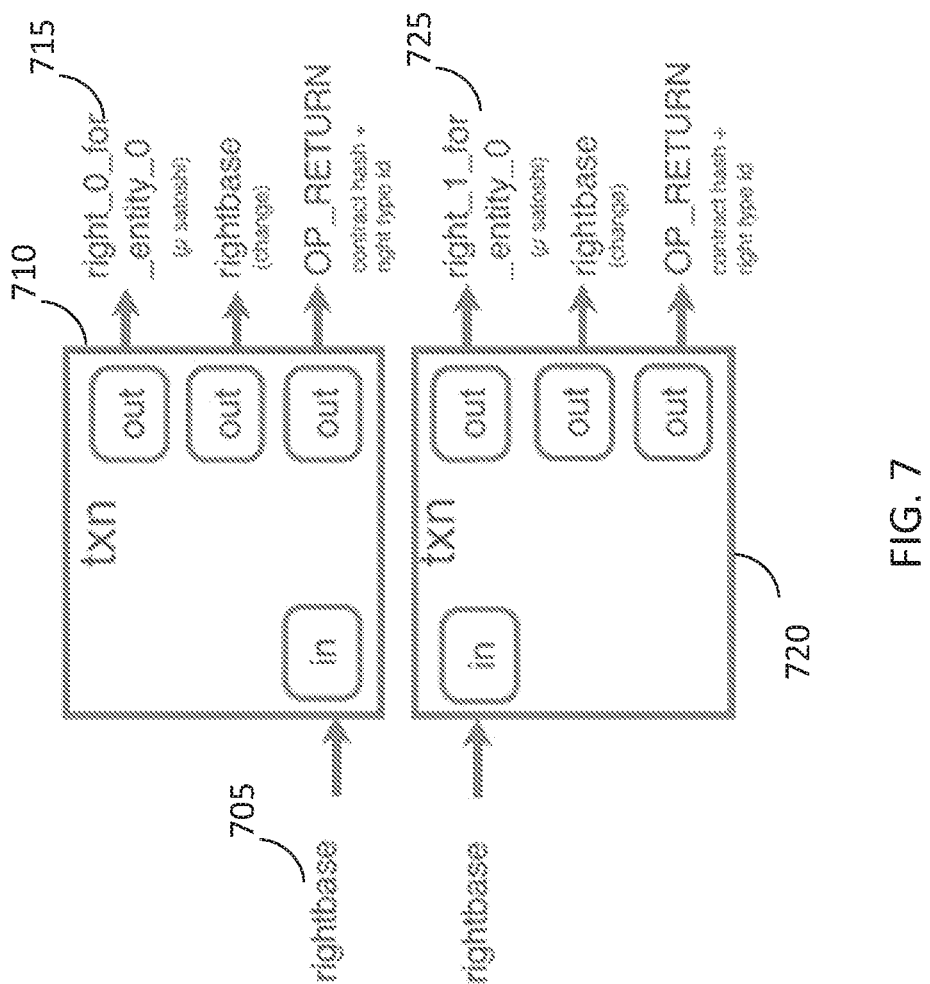
FIG. 7 is a schematic diagram illustrating a creation of a right assigned to digital content.

FIG. 7 is a schematic diagram illustrating a creation of a right assigned to digital content. Transaction 710 occurs when rightbase 705 transfers µ satoshi to a first created right address 715 ("right_0_for_entity_0"), and transaction 720 occurs when rightbase 705 transfers µ satoshi to a second created right address 725. Thus, for an associated digital content item, the content management system 110 performs transactions 710 and 720 to create rights 715 and 725, respectively.

Figure 8:
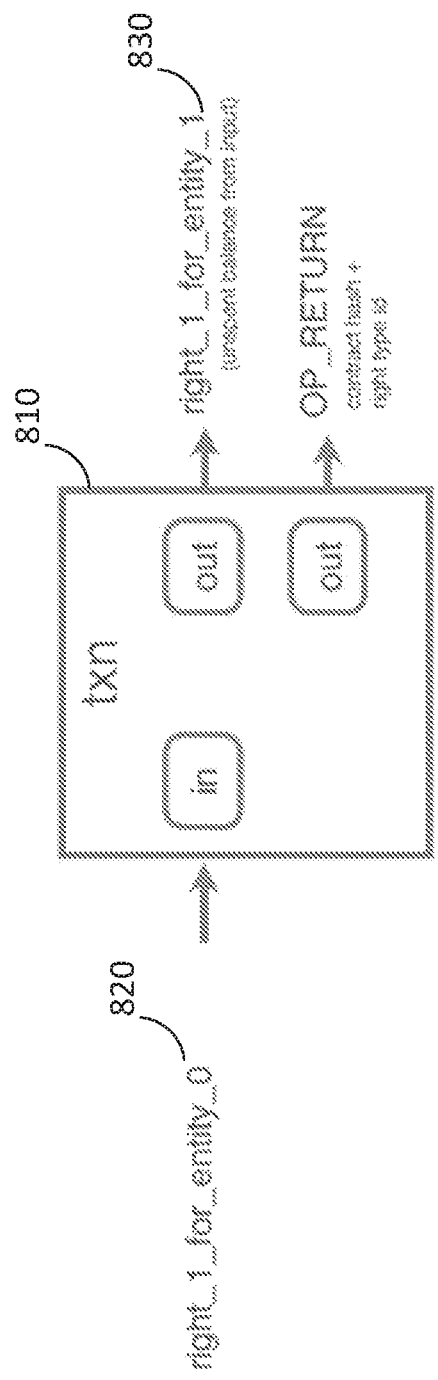
FIG. 8 is a schematic diagram illustrating a transfer of a right assigned to digital content.

When entity_0 wishes to transfer their right to a digital content item to entity_1, the content management system 110 creates a node address to hold and maintain the right for entity_1. FIG. 8 is a schematic diagram illustrating a transfer of a right assigned to digital content. A transaction 810 occurs where an entire unspent balance of µ satoshi transfers from a node address 820 (e.g., "right_1_for_entity_0") of a current right holder to a node address 830 (e.g., "right_1_for_entity_1") of a new right holder, along with data attached via an OP_RETURN output.

Figure 9A:
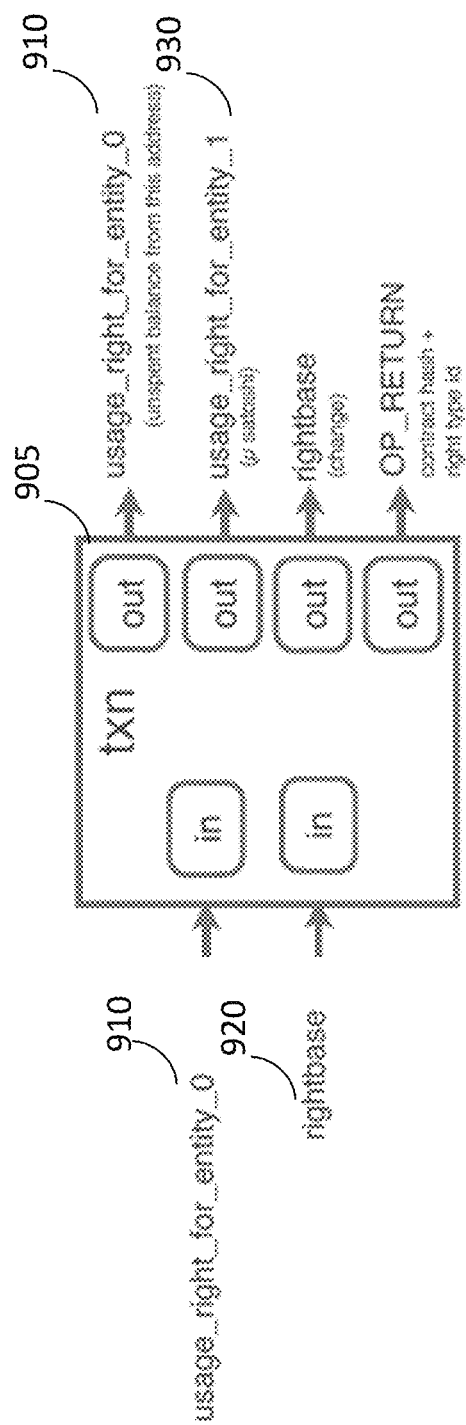
FIG. 9A is a schematic diagram illustrating a cloning of a right assigned to digital content.
Figure 9B:
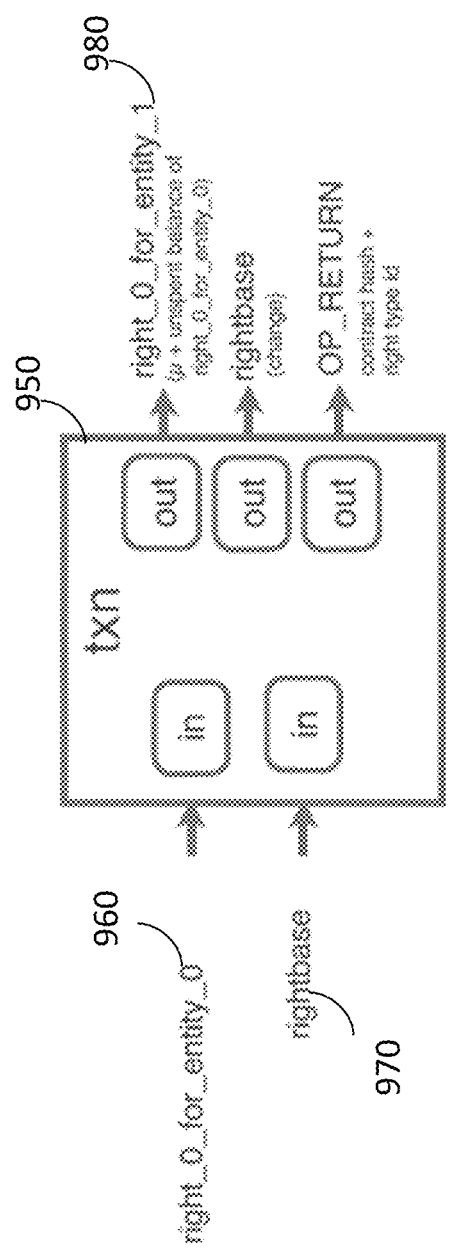
FIG. 9B is a schematic diagram illustrating a transfer of a right assigned to digital content using rightbase supplementation of a transaction.

In some embodiments, contractual models may be associated with cloning or duplicating an existing right to a digital content item, wherein an assignee entity is granted a "usage right," while the assignor entity also retains a usage right and control of other usage rights. FIG. 9A is a schematic diagram illustrating a cloning of a right assigned to digital content. The content management system 110 creates a new address for the newly assigned right (the cloned right), and performs a transaction 905 where both the original right address 910 (e.g., "usage_right_for_entity_0") and rightbase 920 transfer µ satoshi to the original right address 910 and the new address 930 (e.g., "usage_right_for_entity_1"), along with data attached via an OP_RETURN output In some embodiments, mining fees associated with mining digital currency may cause unspent balances associated with right-addresses to fall below a minimum transaction amount (e.g., ~5000 satoshi) and/or applied transaction fees (e.g., ~10,000 satoshi). During such occurrences, as depicted in FIG. 9B, the content management system 110 performs a transaction 950 where both the original right address 960 (e.g., "right_for_entity_0") and rightbase 970 transfer µ satoshi to the new right address (e.g., "right_0_for_entity_1") 980.

In other words, the content management system 110, via the transaction module 220, may determine that an amount of digital currency associated with the parent address node is below a threshold minimum transaction amount, and transfer digital currency from a rightbase to the child address node associated with the recipient of the right to the digital content item.

In some embodiments, the content management system 110 may provide a mechanism for a right holding entity to lease rights to a digital content item. For example, an entity may lease their right to sell royalty free usage for a work to another entity for one year, and after the year, claim the right to sell royalty free usage from the lease, where the lease is no longer able to sell royalty free usage for the work.

Using the "lock time" mechanism for digital currency, the content management system 110 generates two transactions, a first transaction where the right is transferred from the leaser to the lease, and a second transaction, having a set lock time of one year, wherein the right is transferred back to the leaser.

Examples of Digital Content Marketplaces

As described herein, the content management system 110 may provide content management for a variety of different online environments, such as online marketplaces, social network services (e.g., Facebook, LinkedIn, Twitter, and so on), micro-blogs (e.g., Twitter, Pinterest, Tumblr, Instagram), blogs, e-commerce sites, and other environments that support the creation, introduction, sharing, purchase, licensing, renting, and consumption of content.

Figure 10:
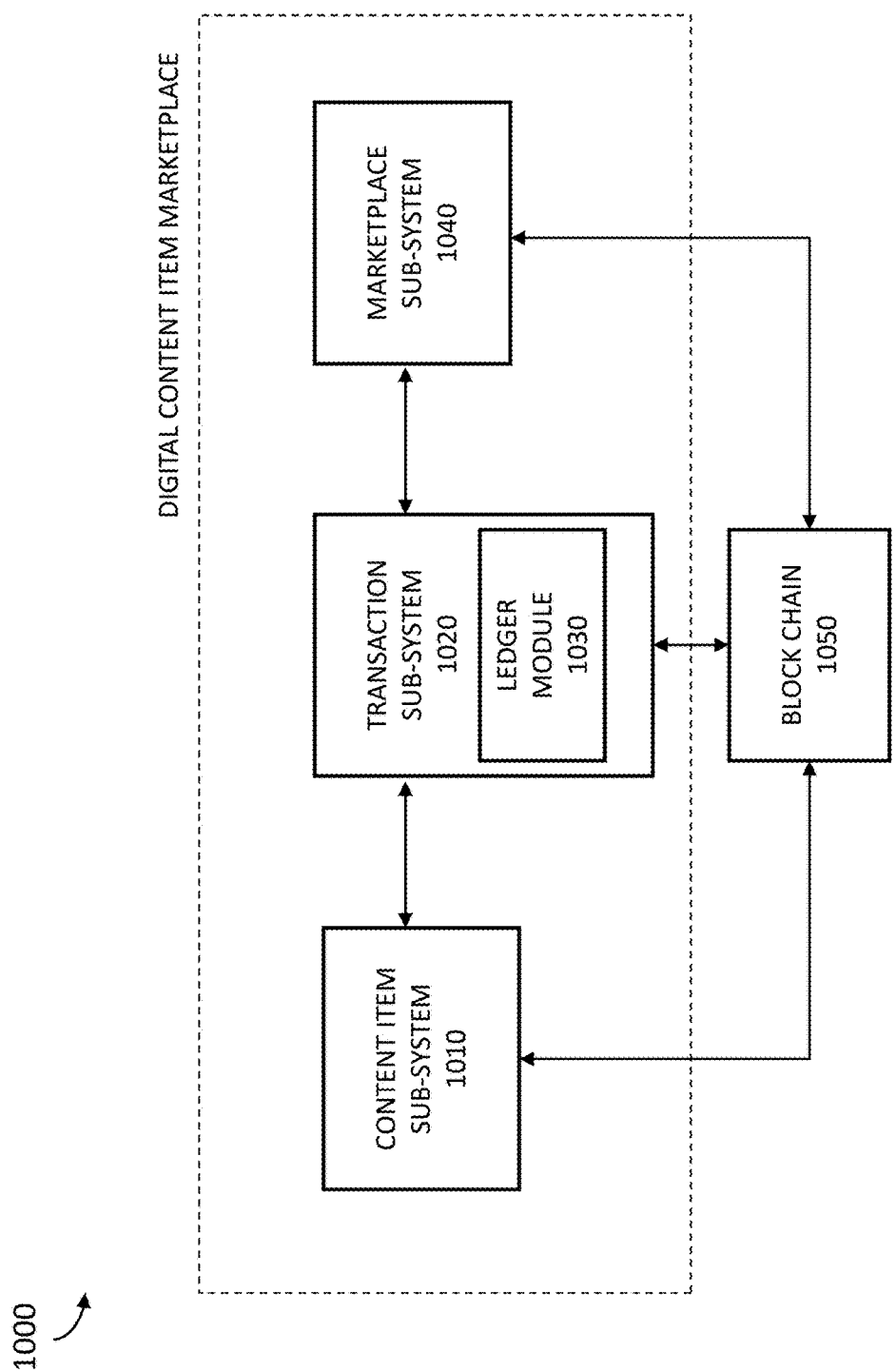
FIG. 10 is a block diagram illustrating systems of a digital content item marketplace.

FIG. 10 is a block diagram illustrating systems, or subsystems of a digital content item marketplace 1000. The marketplace 1000 includes a content item sub-system 10101, a transaction sub-system 1020, and a marketplace sub-system 1030.

In some embodiments, the content item sub-system 1010 receives and manages digital content items, such as images, audio files, video clips, bundles or collections of content, and other multimedia works. The digital content items may include content from owners of digital content items wishing to register the digital content items as available for purchase or licensing via the marketplace sub-system 1030.

In some embodiments, the transaction sub-system 1020 performs block chain transactions associated with transferring rights to use the digital content items managed by the content item sub-system 1010. For example, the transaction sub-system 1020 may utilize a ledger module (as described herein) to transfer one or more rights to use a digital content item from an owner to a recipient by transferring digital currency from a parent address node associated with the owner of the digital content item to a child address node associated with the recipient of the digital content item within a block chain 1050 or other public ledger, and recording the transfer of the digital currency from the parent address node to the child address node in the block chain 1050.

In some embodiments, the marketplace sub-system 1030 facilitates the brokering of rights to the digital content items between owners of the digital content items and recipients of the digital content items. For example, the marketplace sub-system 1030 facilitates:

the selling of an exclusive right to a digital content item from an owner of the digital content item to a recipient of the digital content item;

the selling of a right to an edition of a digital content item from an owner of the digital content item;

the brokering of rights to the digital content items between members of an online social network service (e.g., Twitter or Facebook);

the brokering of rights to the digital content items within an online retail site (e.g., e-commerce site, gallery site, and so on); and other rights or online sites described herein.

The marketplace 1000, therefore, enables rights to digital content items to be exchanged between parties within various online environments (e.g., online media host site 140) while tracking the ownership or provenance of the right to the content via block chain and other public ledger transactions (e.g., the various different digital currency transactions described herein).

Thus, the marketplace 1000, in some embodiments, may be associated with or support an electronic platform or online portal that facilitates the purchase of rights to digital content items, where the platform includes the marketplace sub-system 1030 to facilitate a brokering of rights to digital content items between owners of the digital content items and recipients of the digital content items, and the transaction sub-system 1020 performs block chain transactions associated with transfers of rights the digital content items from owners of the digital content items and recipients of the digital content items.

Figure 11A:
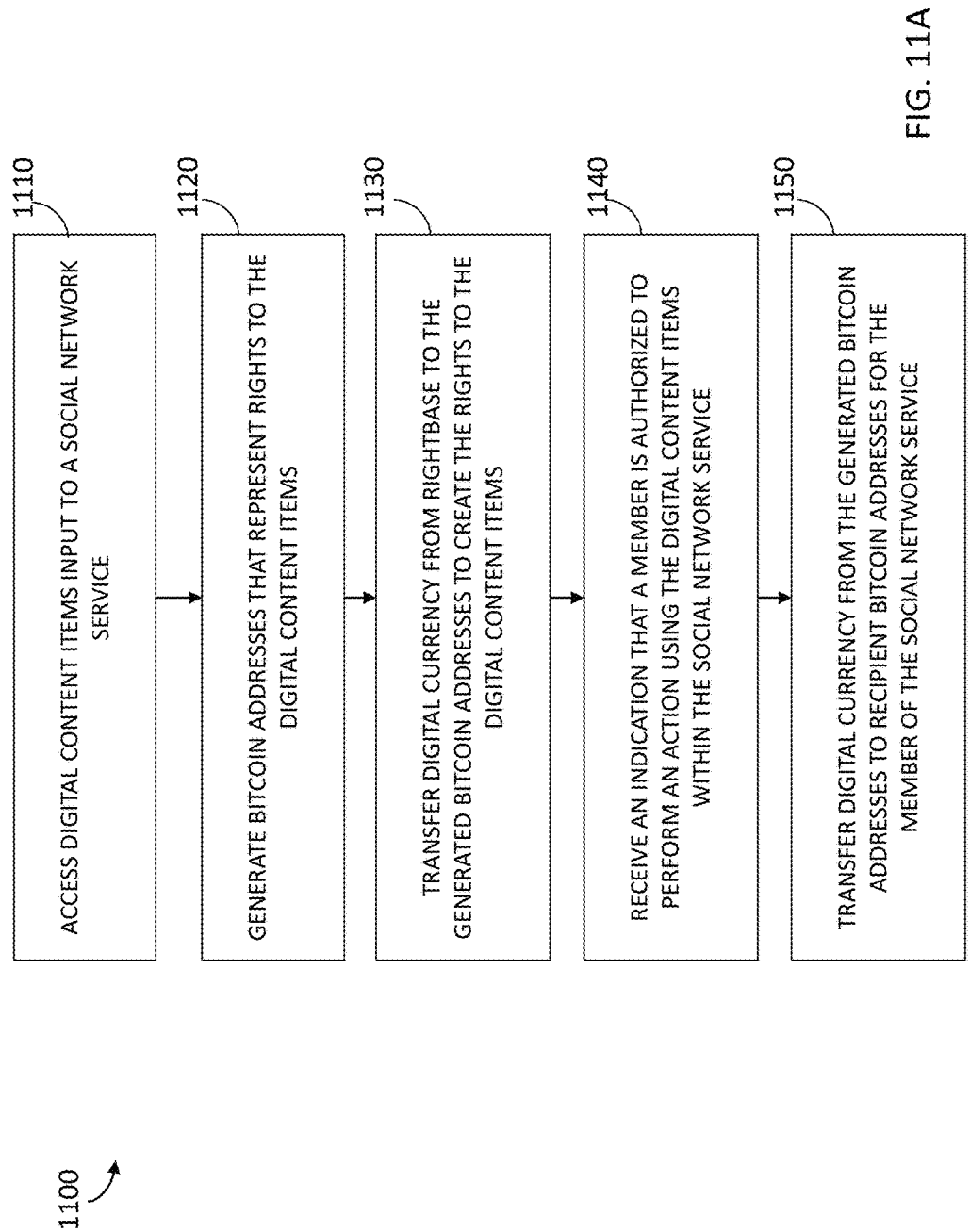
FIG. 11A is a flow diagram illustrating a method for managing content within a social network service.

The marketplace 1000 and its sub-systems 1010,1020, 1030 may facilitate the managing of content within a social network service (e.g., via the content management system 110). FIG. 11A is a flow diagram illustrating a method 1100 for managing content within a social network service. The method 1100 may be performed by the content management system 110 and/or components of the marketplace 1000 and, accordingly, is described herein merely by way of reference thereto. It will be appreciated that the method 1100 may be performed on any suitable hardware or devices/components within the content management system 110 or marketplace 1000.

In operation 1110, the content management system 110 or marketplace 1000 accesses digital content items input to the social network service by a member of the social network service. For example, the content management system 110 may access photos and videos uploaded to a member profile for a member of the social network.

The content management system 110 or marketplace 1000 registers the accessed digital content items input by the member to the social network service by, in operation 1120, generating bitcoin addresses that represents rights to the digital content items, and, in operation 1130, transferring digital currency from a rightbase controlled by the content management system 110 to the generated bitcoin addresses to create the rights to the digital content items. Thus, the content management system 110 may register and assign rights to digital content provided to the social network service (as described herein)

In operation 1140, the content management system 110 or marketplace 1000 receives an indication that another member of the social network service is authorized to perform an action associated with the digital content items within the social network service. For example, the other member may be authorized (implicitly or explicitly) to share or modify the digital content items within other areas of the social network service.

For example, the marketplace sub-system 1030 may receive an indication that the member of the social network service is connected to an owner of the digital content items within the social network service and/or may receive an indication that the member of the social network service is a first degree connection of an owner of the digital content items within the social network service.

Members of social network services may perform various different actions using digital content items, when authorized by owners of the digital content items. For example, the members may:

share the digital content items within a post published to the social network service (e.g., a post made to the member's profile or other area within the social network service);

post a feed item within the social network service that includes one or more of the digital content items, such as a post or feed item made to a feed accessible by some members of the social network service (e.g., connections to the member or original owner of the content item), and/or a feed accessible by all members of the social network service or any online viewers of the feed (e.g., an open Twitter feed);

The content management system 110 or marketplace 1000, in operation 1150, transfers digital currency from the generated bitcoin addresses to recipient bitcoin addresses associated the other member of the social network service, and records the transfer of the digital currency in a block chain associated with the digital content items. For example, the transaction sub-system 1020 may transfer digital currency from the generated bitcoin addresses associated with the rights to the digital content items to bitcoin addresses associated with the member of the social network service after the member of the social network service shares a digital content item within the social network service.

Social network services (e.g., Facebook, Twitter, and so on) often provide their members and other users with various types of information or content, such as content associated with trending topics or events, current or topical news stories, and so on. The services may act as platforms for quick and efficient dissemination of information to many people, including content provided by their members and users. The systems described herein, in some embodiments, provide mechanisms to control the sharing, licensing, purchasing, and so on, of content provided by users to the social network services and shared or otherwise utilized by other members or users (e.g., news or corporate entities) for financial or advertising gains, among other things.

Figure 11B:
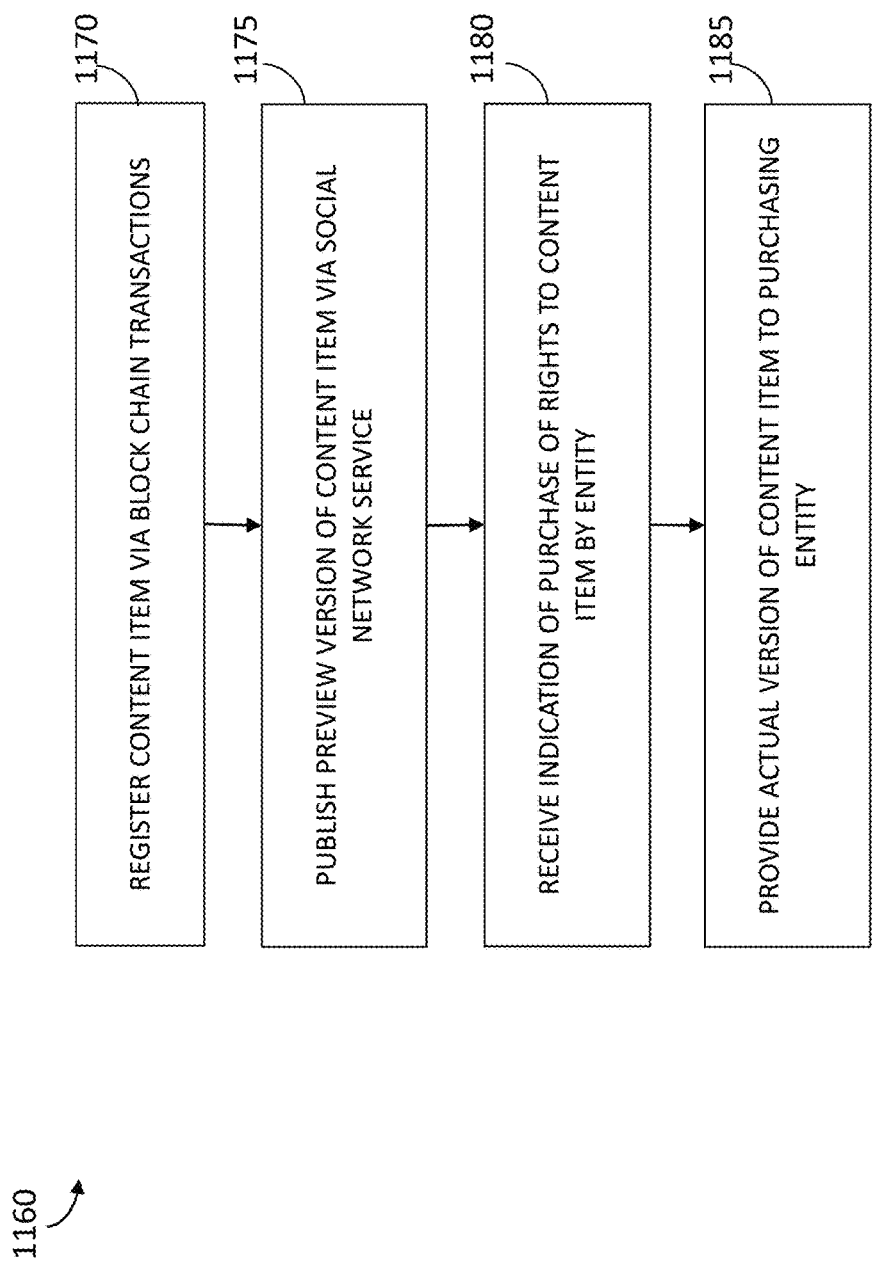
FIG. 11B is a flow diagram illustrating a method for sharing content within a social network service.

The marketplace 1000 and its sub-systems 1010,1020, 1030 may regulate the use or sharing of content within a social network service (e.g., via the content management system 110). FIG. 11B is a flow diagram illustrating a method 1160 for sharing content within a social network service or other online environment. The method 1160 may be performed by the content management system 110 and/or components of the marketplace 1000 and, accordingly, is described herein merely by way of reference thereto. It will be appreciated that the method 1160 may be performed on any suitable hardware or devices/components within the content management system 110 or marketplace 1000.

In operation 1170, the content management system 110 or marketplace 1000 registers a digital content item to the social network service by performing a block chain transaction within a block chain associated with the social network service, as described herein.

In operation 1175, the content management system 110 or marketplace 1000 publishes a preview version of the digital content item within the social network service. For example, the preview version may be a watermarked version of the digital content item (e.g., an image of a photo with an applied watermark), a low-resolution version of the digital content item (e.g., a low resolution image of a photo), an abridged version of the digital content item (e.g., the first few seconds of a video of a topical event), and so on.

In operation 1180, the content management system 110 or marketplace 1000 receives an indication of a purchase of rights to the digital content item by an entity associated with the social network service. For example, the content management system 110 or marketplace 1000 may receive an indication that the entity associated with the social network service has purchased an exclusive right to the digital content item, that the entity associated with the social network service has purchased a right to an edition of the digital content item, that the entity associated with the social network service has purchased, a right to remix the edition of the digital content item, and/or various combinations of rights to digital content items, as described herein.

In operation 1185, the content management system 110 or marketplace 1000 provides an actual version of the digital content item to the entity that purchased the rights to the digital content item. For example, the actual version may be an unedited or source version of the digital content item, a high-resolution version of the digital content item, a complete version of the digital content item (e.g., the complete video of the topical event), and so on.

The content management system 110 or marketplace 1000 may transfer digital currency from a parent address node associated with an owner of the digital content item to a child address node associated with the entity that purchased the rights to the digital content item, record the transfer of the digital currency from the parent address node to the child address node in the block chain associated with the social network service, and provide the actual version of the digital content item to the entity that purchased the rights to the digital content item after the transfer of the digital currency from the parent address node to the child address node is recorded in the block chain associated with the social network service.

Thus, in some embodiments, the content management system 110 or marketplace 1000 enables users of social network services to be compensated and/or otherwise control or manager the use of the digital content they provide to various different social network services. The following scenarios may utilize aspects of the marketplace 100 described herein.

As a first scenario, the content management system 110 or marketplace 1000 may facilitate the licensing or purchasing of content provided by users during "breaking news" scenarios where many different users are providing content to a social network service during an ongoing event.

For example, a user captures a photo or video of an ongoing event or scenario (e.g., a video of footage of a crime scene), and publishes the video to his social network service feed after registering the photo via the marketplace 1000. The marketplace 1000 causes the video to be published as an abridged version. A news outlet (e.g., entity) reporting on the ongoing event takes an exclusive license to various rights to use and remix the video, and the marketplace 1000 facilitates a payment from the entity to the user for the exclusive license to the rights. The news outlet receives a complete version of the video, and shares the video within various feed items published to the social network service by the news outlet.

As a second scenario, the content management system 110 or marketplace 1000 may facilitate an entity licensing or purchasing content from users during the "breaking news" scenarios.

For example, the news outlet described herein publishes a feed item to the social network service requesting content associated with a certain ongoing event (e.g., feed items having a hashtag associated with the ongoing event—"#ongoingevent"). The news outlet reviews user submissions (e.g., tweets or other posts that include the hashtag or are direct replies to the request), having a preview version of relevant content, and selects content from one or more of the posts for purchase or licensing from the owners of the content. The marketplace 1000 facilitates a payment from the news outlet to the users providing the selected content, and provides the news outlet with a complete version of the content, which shares the content within various feed items published to the social network service by the news outlet. Of course other scenarios may be supported by the marketplace 1000.

Thus, in some embodiments, the marketplace 1000 enables social networks and other online environments that present and enable the use of content to regulate and track use of the content by all members, among other benefits.

Examples of Generating Digital Contracts for Rights to Content Items

As described herein, in some embodiments, the content management system 110 manages the transfer of rights to digital content between parties (such as between owners of the content and recipients of the content). Often, each content item is associated with a collection of similar, yet different rights to the content. For example, the rights to a digital content item may include a right to use the digital content item, a right to an exclusive use of the digital content item, a right to an edition (e.g., 1 edition of 10 total versions) of the digital content item, a right to modify or remix the digital content item, a right to the title (or, to change the title) of the digital content item, a right to resell or transfer use of the digital content item, and so on.

In order to track the various rights registered, assigned, and/or transferred with respect to digital content, the content management system 110 may generate digital contracts that include the collection of rights for digital content. A digital contract, therefore, may include information associated with rights assigned to the digital content (e.g., block chain addresses established for each right), as well as information representing the digital content and other information, such as plain language information for the contract. The digital contract, therefore, is an electronic document or file that includes a set of block chain addresses that represent the rights assigned to a digital content item.

Figure 12:
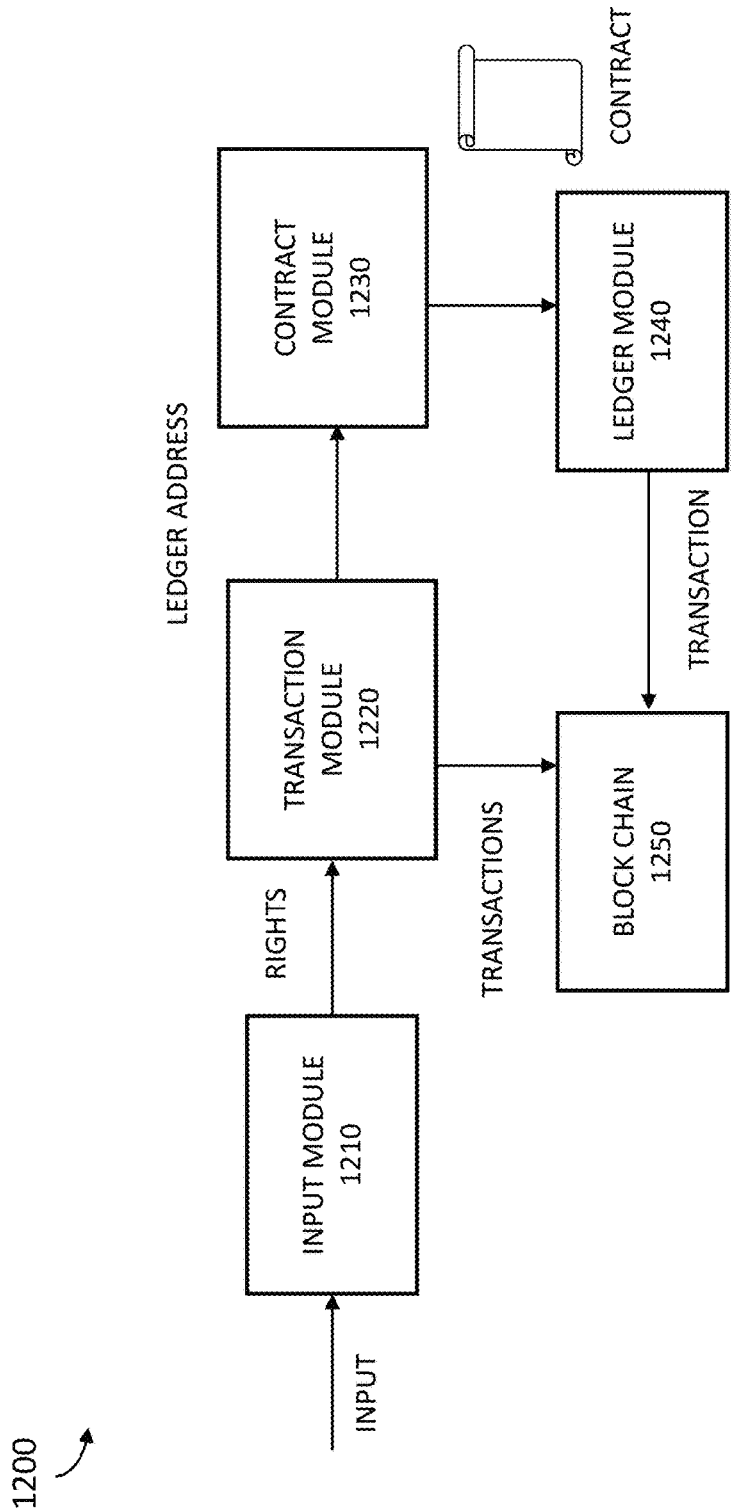
FIG. 12 is a block diagram illustrating interactions between components during the creation of a digital contract of rights to a digital content item.

FIG. 12 is a block diagram 1200 illustrating interactions between components during the creation of a digital contract of rights to a digital content item. These components may form a system for generating a digital contract for rights to a digital content item, and include an input module 1210 that receives input associated with rights assigned to a digital content item, a transaction module 1220 that performs block chain transactions within a block chain 1250 for each of the rights identified by the input module 1210, and a contract module 1230 that generates a digital contract that includes the rights assigned to the digital content item, and, via a ledger module 1240, performs a transaction to register the digital contract within the block chain 1250.

In some embodiments, the input module 1210 receives input associated with transferring rights of a digital content item to a recipient. For example, the input module may receive associated with transferring rights of the digital content item to the recipient via a user interface provided or rendered by the content management system 110 that includes multiple user-selectable options associated with rights to be transferred to the recipient. Example user-selectable options include:

user-selectable options associated with a transaction type for a transfer of rights to the recipient;

user-selectable options associated with a type of the digital content item;

user-selectable options associated with a version of the digital content item;

user-selectable options associated with a price for rights to the digital content item;

user-selectable options associated with a right to modify the digital content item; and so on.

In some embodiments, the transaction module 1220 performs one or more block chain transactions to register each right of the digital content item to transfer to the recipient to a public ledger or block chain 1250. As described herein, the transaction module 1220 may generate an address node as a bitcoin address that represents a right to be provided to a recipient, and transfer digital currency from a rightbase (e.g., address associated with the content management system 110) to the address node to create the right to the digital content item.

For example, the transaction module 1220 performs a separate transaction (e.g., currency transfer) for each right assigned to the digital content item. Example transfers include:

a digital currency transfer transaction between address nodes to register a title of the digital content item;

a digital currency transfer transaction between address nodes to register a right to transfer the title of the digital content item to a recipient;

a digital currency transfer transaction between address nodes to register a right to remix the digital content item by a recipient;

a digital currency transfer transaction between address nodes to register a right to transfer a right to remix the digital content item to a recipient; and so on.

In some embodiments, the contract module 1230 performs a block chain transaction to register a digital contract that includes information representing each of the performed one or more block chain transactions to the public ledger. For example, the contract module 1230 generates the digital contract as a collection of the rights that includes node addresses registered to the public ledger 1250 that represent each of the rights to the digital content transferred to the recipient.

The digital contract may include various types of information, and include both encrypted (e.g., un-accessible) and unencrypted (e.g., accessible) portions or sections. For example, a generated digital contract may include:

a first unencrypted portion that includes the information representing each of the performed one or more block chain transactions to the public ledger;

a second unencrypted portion that includes a digital fingerprint representing the digital content item; and/or an encrypted portion that includes a plain language version of the rights transferred to the recipient.

The contract module 1230 may register the digital contract to the public ledger by transferring digital currency from a parent address node to a child address node associated with registering the digital contract to the block ledger, and recording the transfer of the digital currency from the parent address node to the child address node in the public ledger. In some cases, the contract module 1230 associates data to the transfer of the currency (e.g., via an OP_RETURN field in a bitcoin transaction) that includes information representing a digital fingerprint of the digital contract (e.g., a SHA-256 hash value of the contract), and information representing a contract type for the digital contract, among other information.

Thus, the content management system 110 may perform various methods or processes when generating digital contracts, or other collections of rights assigned to digital content items. FIG. 13 is a flow diagram illustrating a method 1300 for generating a digital contract of rights to a digital content item. The method 1300 may be performed by the content management system 110 and, accordingly, is described herein merely by way of reference thereto. It will be appreciated that the method 1300 may be performed on any suitable hardware or devices/components within the content management system 110.

In operation 1310, the content management system 110 receives input associated with transferring rights of a digital content item to a recipient. For example, the input module may receive associated with transferring rights of the digital content item to the recipient via a user interface provided or rendered by the content management system 110 that includes multiple user-selectable options associated with rights to be transferred to the recipient.

In operation 1320, the content management system 110 performs one or more block chain transactions to register each right of the digital content item to transfer to the recipient to a public ledger. For example, the transaction module 1220 may generate an address node as a bitcoin address that represents a right to be provided to a recipient, and transfer digital currency from a rightbase (e.g., address associated with the content management system 110) to the address node to create the right to the digital content item. The transaction module 1220 may perform a separate transaction (e.g., currency transfer) for each right assigned to the digital content item.

In operation 1330, the content management system 110 performs a block chain transaction to register a digital contract that includes information representing each of the performed one or more block chain transactions to the public ledger. For example, the contract module 1230 generates the digital contract as a collection of the rights that includes node addresses registered to the public ledger 1250 that represent each of the rights to the digital content transferred to the recipient.

Figure 14A:
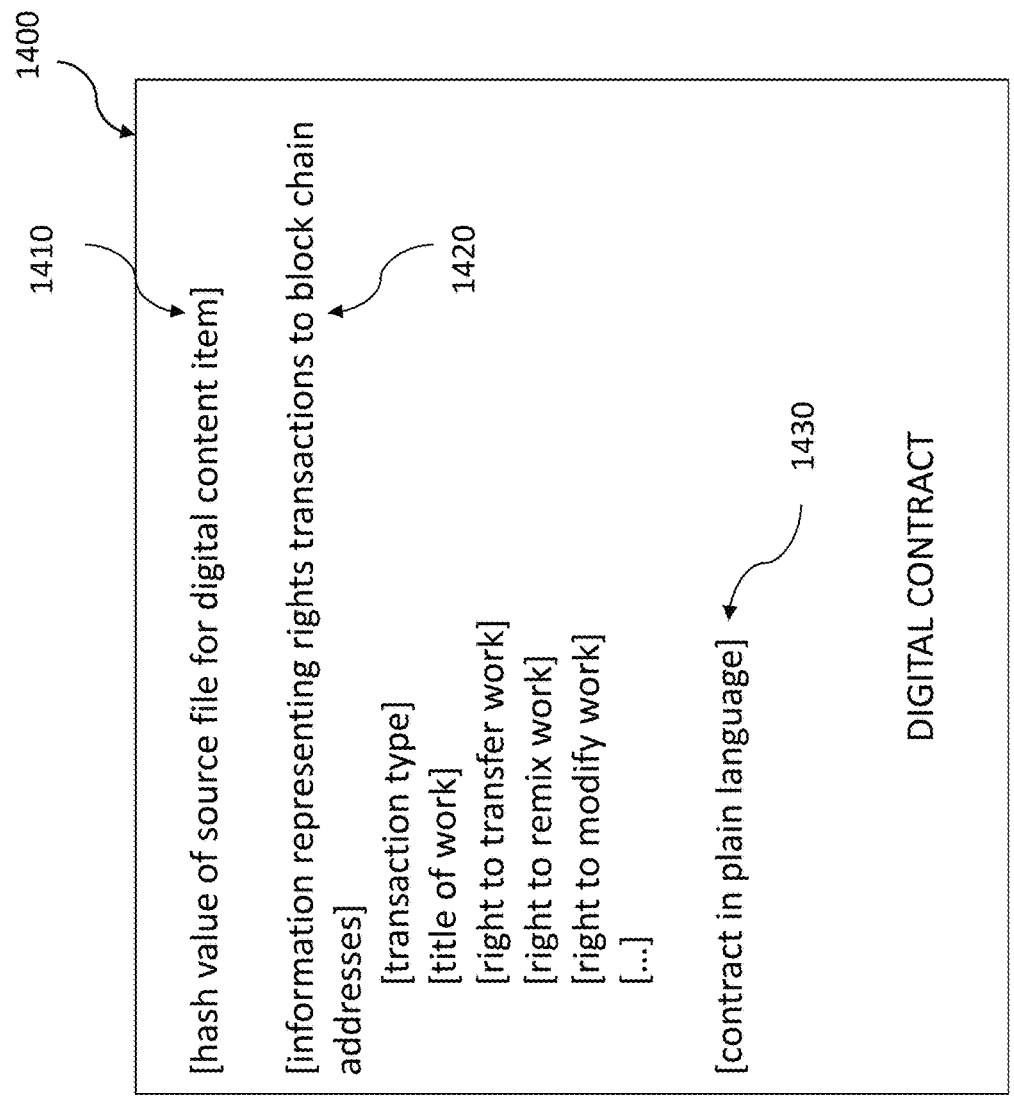
FIG. 14A is a representation of a digital contract of rights to a digital content item.

FIG. 14A depicts an example digital contract 1400 of rights to a digital content item. The digital contract 1400 includes information representing the digital content item 1410 (e.g., a hash value of a source file of the digital content item), information representing rights transactions to block chain addresses 1420 (e.g., the first or initial addresses that received a digital currency transfer to establish the rights to the digital content item), and other information (optionally encrypted or private) 1430, such as plain language information for the contract.

The information representing the rights to the digital content items 1420 may be a group of block chain addresses (e.g., bitcoin addresses) associated with each right, as registered on the block chain, and, as shown in the Figure, may include an address associated with a transaction type to transfer to the digital content item, a right to the title of the digital content item, a right to transfer the digital content item, a right to remix the digital content item, a right to resell the digital content item, a right to modify the digital content item, and other rights described herein.

Referring back to operation 1330, the contract module 1230 may register the digital contract to the public ledger by transferring digital currency from a parent address node to a child address node associated with registering the digital contract to the block ledger, and recording the transfer of the digital currency from the parent address node to the child address node in the public ledger. In some cases, the contract module 1230 associates data to the transfer of the currency (e.g., via an OP_RETURN field in a bitcoin transaction) that includes information representing a digital fingerprint of the digital contract (e.g., a SHA-256 hash value of the contract), and information representing a contract type for the digital contract, among other information.

Figure 14B:
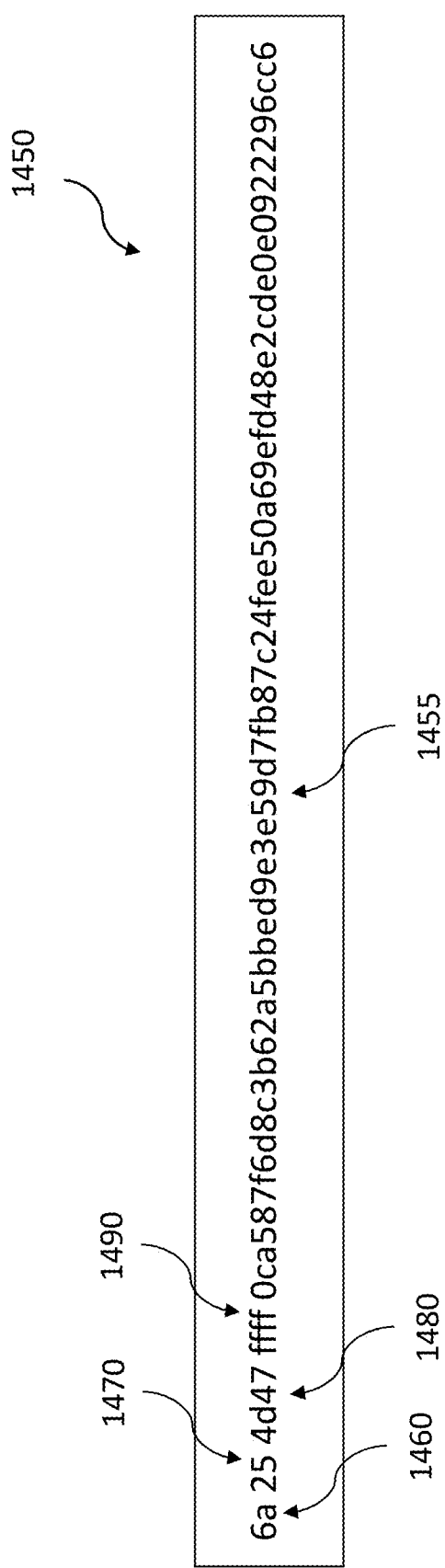
FIG. 14B is a representation of information associated with a digital content item that is included in a block chain transaction.

FIG. 14B is a representation of information 1450 associated with a digital content item that is included in a block chain transaction to register the digital contract within a block chain or public ledger. The information 1450 accompanying the digital currency transaction may include:

information representing a digital fingerprint of the digital contract (e.g., a SHA-256 hash value) 1455;

information representing a content management specific identifier for the version of the contract (e.g., version "00") 1460;

information representing the document type for the digital contract 1465;

information representing the digital fingerprint is part of the content management system 1465 (for discoverability within the block chain); and information representing the number of bytes in the digital fingerprint (e.g., "25" in the hexadecimal) 1470; and/or information representing an instruction that this is a message to include with a currency transaction (e.g., within the OP_RETURN field in a bitcoin transaction) 1475. Of course, other information may be included.

Therefore, the content management system 110 may perform multiple digital currency transfers between address nodes to register a collection of rights to a digital content item to a block chain, and perform a digital currency transfer transaction between address nodes to register the collection of rights to the block chain. These transactions function to establish the rights to the digital content item via the block chain, and record the transfer of ownership via a digital contract) to the block chain, providing a transparent way of tracking and maintaining the provenance to the rights to use digital content items, among other benefits.

As described herein, the input module 1210 may render, present, display, or cause to be displayed a series of user interfaces that enable a user or owner of a digital content item to register a work and rights to the work within the content management system 110.

Figure 15A:
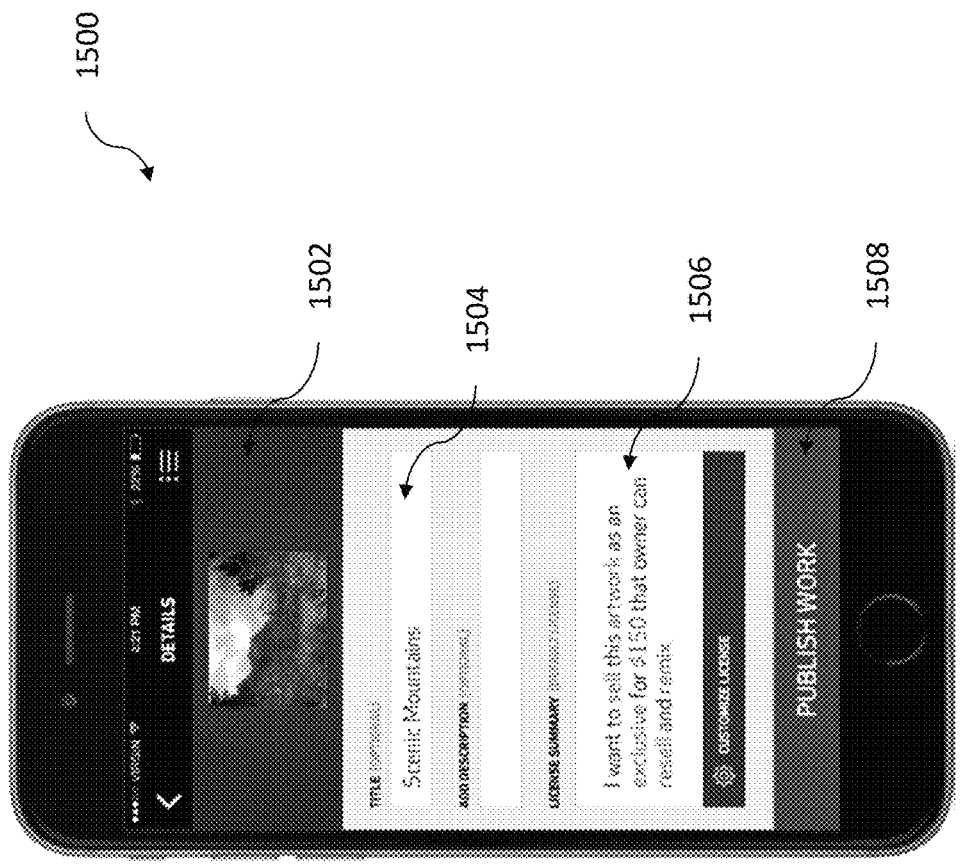
FIGS. 15A-F are display diagrams illustrating example user interfaces for registering a digital content item.

FIG. 15A depicts a user interface 1500 via which an owner of a work may register the work to the content management system 110. The user interface 1500 displays an image of the work 1502, a editable title field 1504 and description field via which the owner may input title and other description information for the work, a license summary field 1506 that displays the rights to be assigned to the work (to be configured by the owner), and a user-selectable button 1508, that, when selected by the owner, causes the content management system 110 to perform the various processed described herein and register the work (and, associated rights to the work) to the content management system 110 by performing one or more block chain transactions.

Figure 15B:
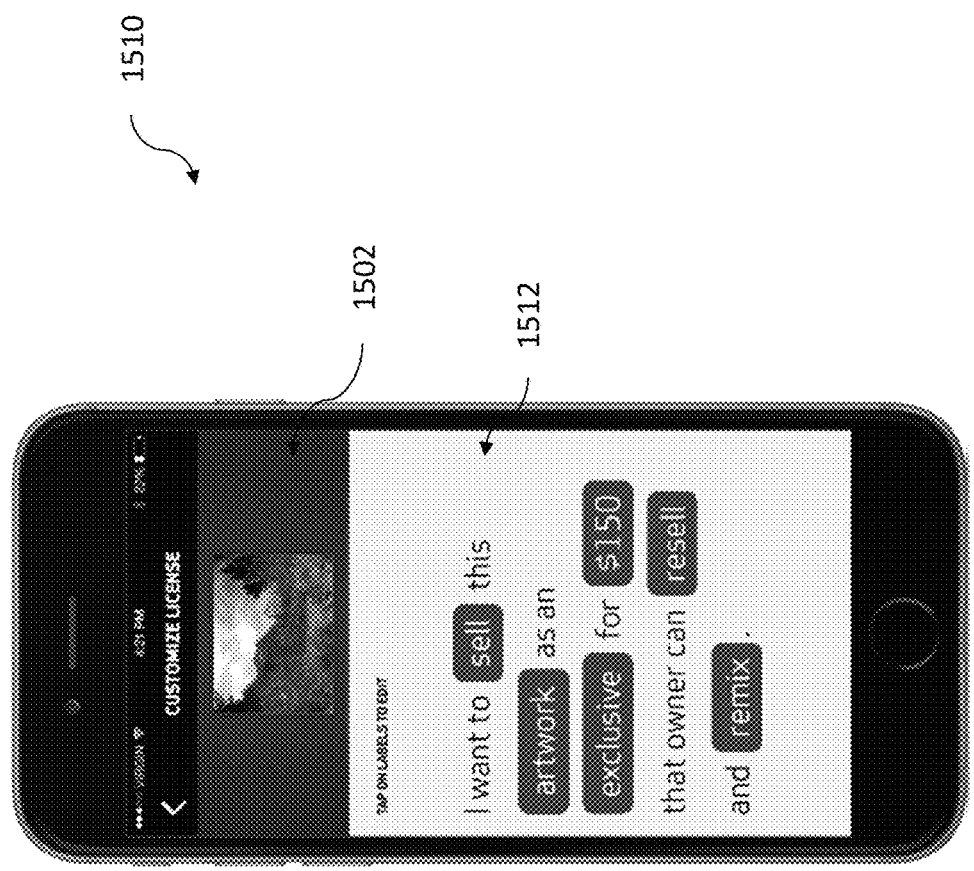

FIG. 15B depicts a user interface 1510 whereby an owner may select or adjust the rights to be assigned to the work 1502 (via user-selectable options for each of the rights). For example, the user interface 1510 shows the initial rights assigned to the work 1502, as "I want to SELL this ARTWORK as an EXCLUSIVE for $150 that owner can RESELL and REMIX."

Figure 15C:
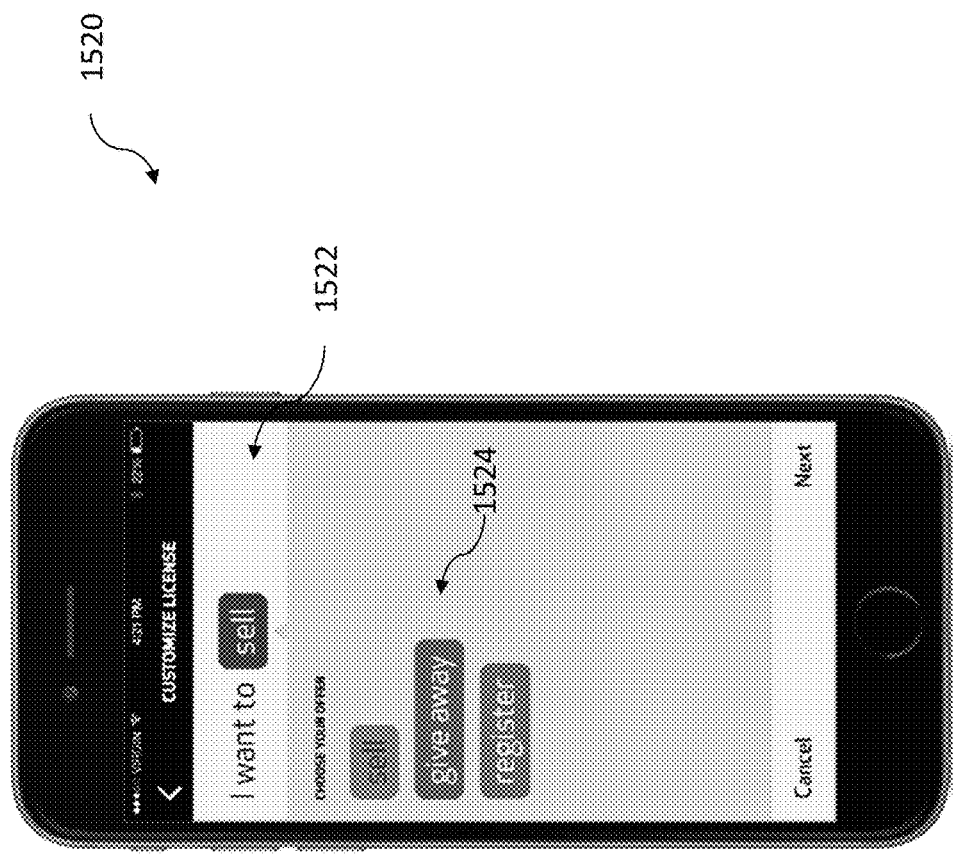

FIG. 15C depicts a user interface 1520 that facilitates the customization of the license, whereby an owner adjusts the transaction type right to be assigned to the work 1502. For example, the user interface 1520 shows the selected transaction type 1522 ("I want to sell"), and user-selectable options 1524 associated with different selectable transaction types (e.g., "sell," "give away," or "register").

Figure 15D:
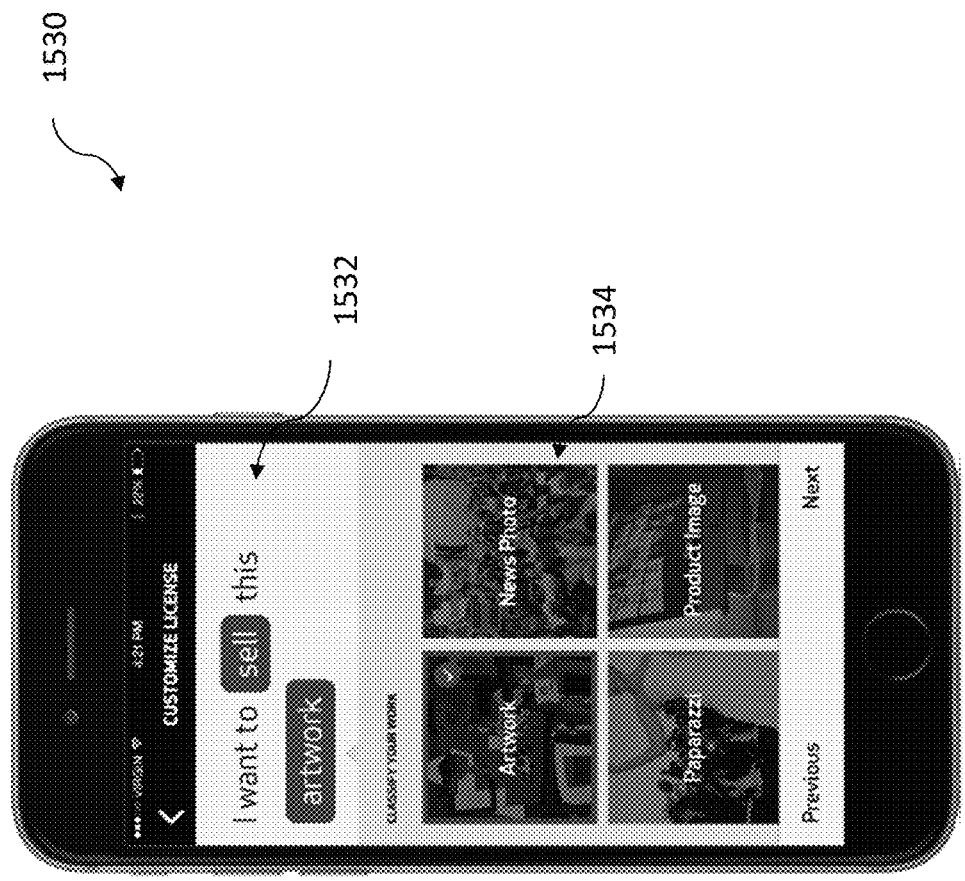

FIG. 15D depicts a user interface 1530 that facilitates the customization of the license, whereby an owner adjusts the type of the work 1502. For example, the user interface 1530 shows the selected type of work 1532 ("I want to sell this artwork"), and user-selectable options 1534 associated with different work types (e.g., "artwork," "news photo," "product image," or "paparazzi").

Figure 15E:
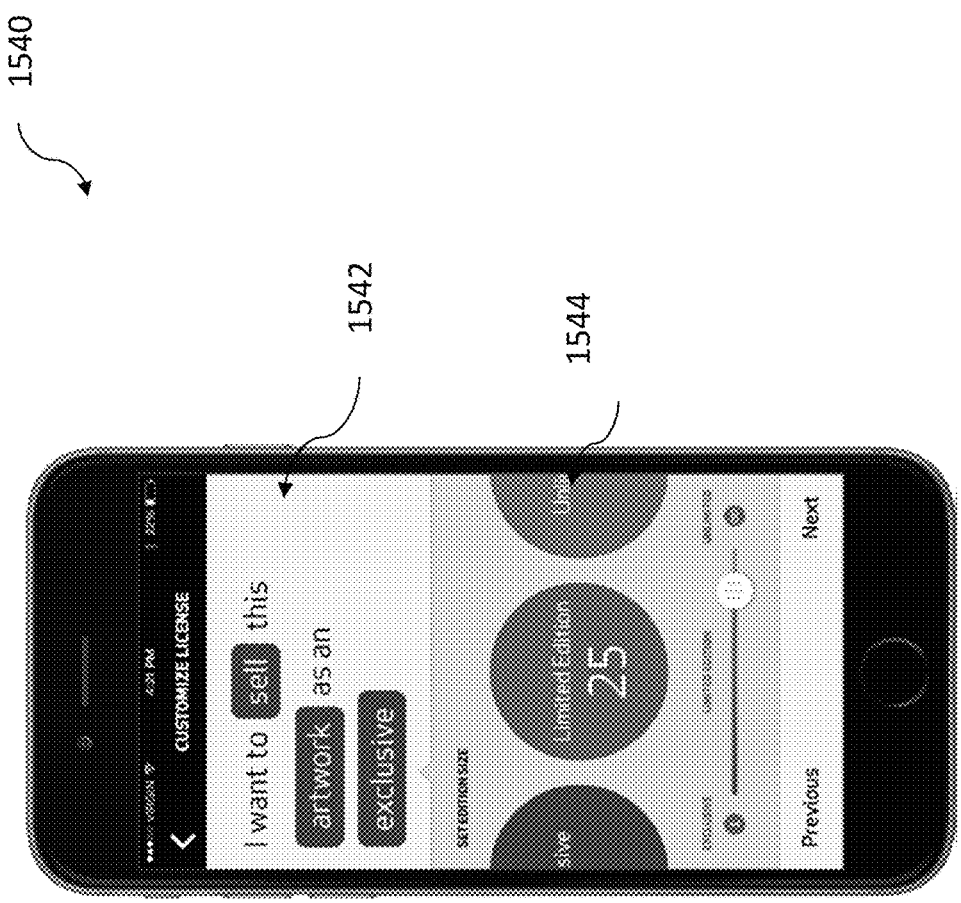

FIG. 15E depicts a user interface 1540 that facilitates the customization of the license, whereby an owner adjusts the number of available editions of the work 1502. For example, the user interface 1540 shows the selected edition of work 1542 ("I want to sell this artwork as an exclusive"), and user-selectable options 1544 associated with different edition sizes (e.g., "edition of 25").

Figure 15F:
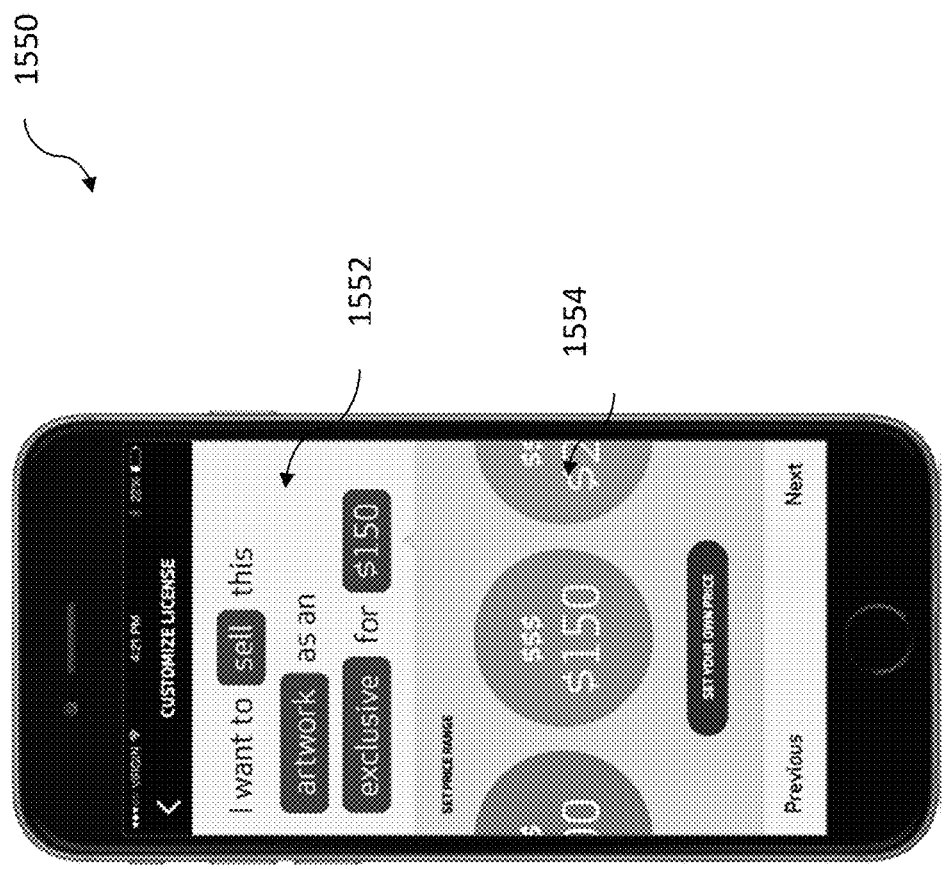

FIG. 15F depicts a user interface 1550 that facilitates the customization of the license, whereby an owner adjusts the price of the work 1502. For example, the user interface 1550 shows the selected price of the work 1552 ("I want to sell this artwork as an exclusive for $150"), and user-selectable options 1554 associated with different prices for the work, such as system generated prices, user input prices, and so on. Of course, the content management system 110 may present other user interfaces not shown herein when facilitating the customization of licenses for digital content items.

Thus, in some embodiments, the content management system 110 provides mechanisms for owners of digital content to customize licenses to the rights of the digital content. Once the input is received, the content management system 110 registers the digital content by performing various block chain transactions for some or all of the user-configurable rights within the licenses, as described herein.

Examples of Authenticating New Digital Content Items

As described herein, the corpus of digital content items managed by the content management system 110 gets larger as users submit and register new digital content items within the system 110. In order to provide purchasers and other recipients of rights to digital content items, the content management system 110 includes various mechanisms that act to authenticate or verify that content items received from owners into the system 110 are actual, legitimately-owned or possessed versions of the received content items (and not copies, fakes, or modifications of source items owned by others).

The content management system 110, therefore, may include various components that attempt to authenticate newly received digital content items before the content items (and associated rights) are registered within the system 110 (e.g., via block chain transactions). FIG. 16 is a block diagram 1600 illustrating interactions between components during the authentication of a newly registered digital content item.

The content management system 110, therefore, may include an authentication module 1610 that receives or otherwise accesses new digital content items, performs various processes to authenticate the digital content items as authentic or real, and provides the digital content items, or information representing the digital content items (e.g., hash values) to the ledger module 1240, which performs block chain transactions within the block chain 1250 to register the new digital content items, and associated rights, to the block chain.

Figure 17:
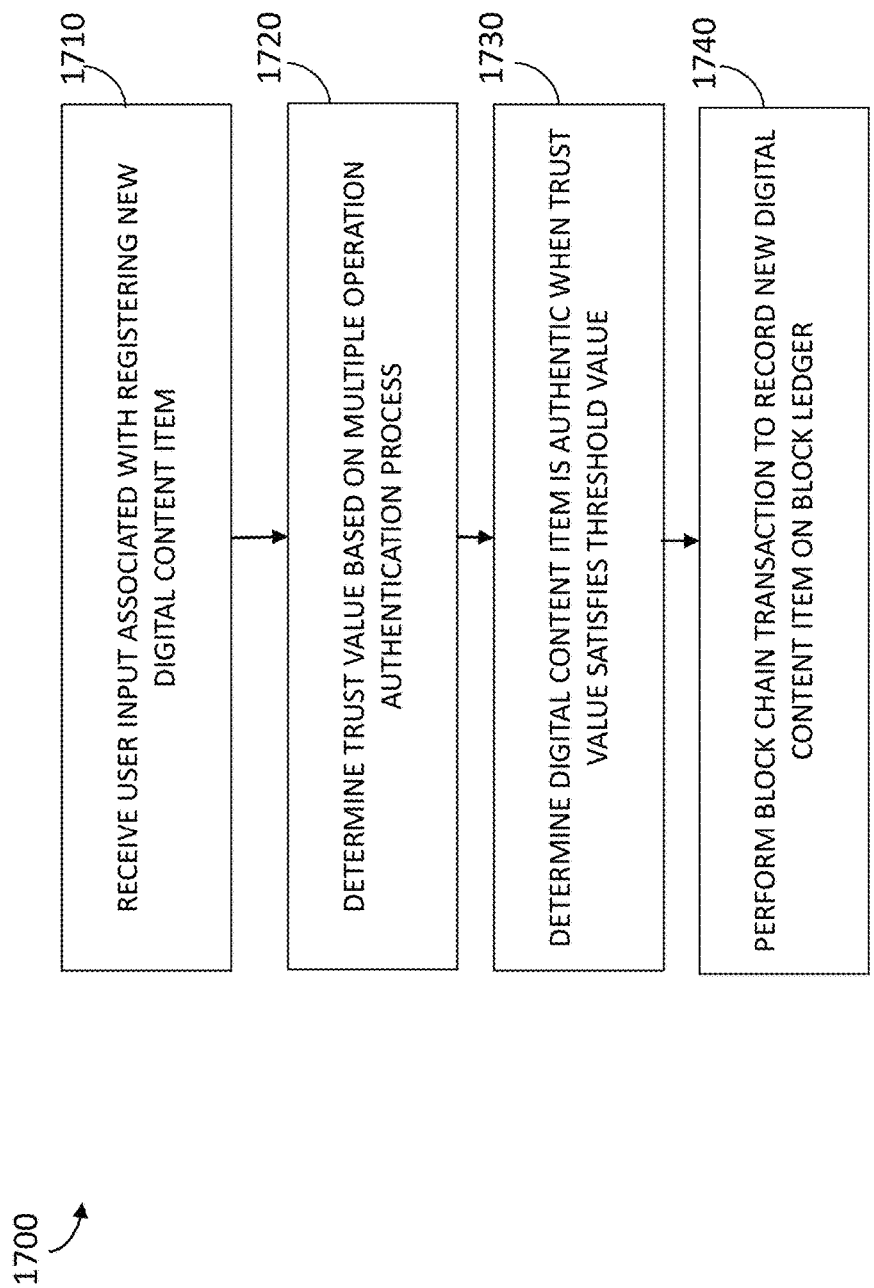
FIG. 17 is a flow diagram illustrating a method for authenticating a new digital content item.

FIG. 17 is a flow diagram illustrating a method 1700 for authenticating a new digital content item. The method 1700 may be performed by the content management system 110 and, accordingly, is described herein merely by way of reference thereto. It will be appreciated that the method 1700 may be performed on any suitable hardware or devices/components within the content management system 110.

In operation 1710, the content management system 110 receives user input associated with registering the digital content item to the content management system 110. For example, the input module 1210 of FIG. 12 may render, present, display, or cause to be displayed a series of user interfaces that enable a user or owner of a digital content item to submit and register a new work and associated rights to be assigned to the work within the content management system 110.

In operation 1720, the content management system 110 performs a multiple operation authentication processes to determine or calculate a trust value for the digital content item. For example, the authentication module 1610 may calculate an overall trust value for the digital content item that is based on a trust value assigned to the digital content item, and a trust value assigned to a user that provided the digital content item to the content management system 110. The authentication module 1610 may perform a more rigorous series of operations to determine the overall trust value, as follows.

Figure 18:
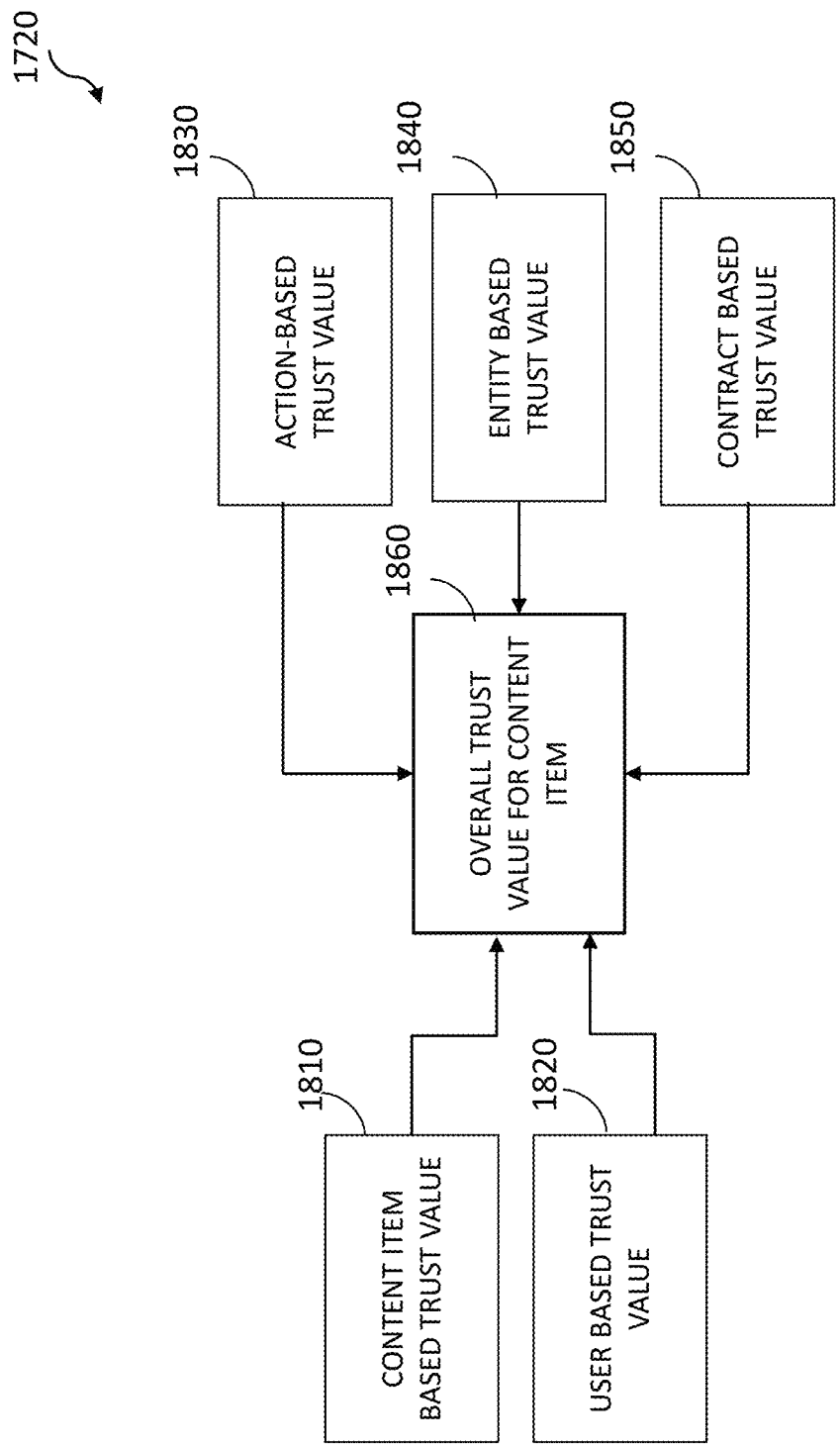
FIG. 18 is a block diagram illustrating interactions between components during the determination of a trust value for a new digital content item.

FIG. 18 is a block diagram 1800 illustrating interactions between components during the determination of an overall trust value 1860 for a new digital content item. The overall trust value 1860 may include or combine values ascribed to different factors associated with the digital content item and/or owner of the digital content item, such as:

a trust value 1810 assigned to the digital content item (e.g., by performing a reverse image search for the digital content item and assigning a value based on results of the performed reverse image search, and/or receiving one or more source materials for the digital content item and assigning a value based on the received one or more source materials);

a trust value 1820 assigned to a user that provided the digital content item to the content management system (e.g., determining the user is a known or verified user, and assigning a trust value based on knowledge about the user, and/or a trust value 1830 assigned to actions performed by the user when interacting with the content management system (e.g., accessing user activity and correspondence information within or outside of the content management system 110 and determining a trust value based on the accessed user activity information);

a trust value 1840 assigned to an entity that includes the user that provided the digital content item to the content management system (e.g., accessing entities of which the user is affiliated or represents and determining a trust value based on the entity information);

a trust value 1850 assigned to a type of digital contract provided by the user that includes rights to the digital content item (e.g., whether the contract includes title insurance); and so on.

For example, given an overall trust value is a composite of each of the trust values 1810-1850, an example overall trust value (up to 10 points) for a new digital content item is calculated as follows:

trust value 1810—5/5 points, because reverse image search found no results, and source materials were provided by the owner of the digital content item;

trust value 1820—2/2 points, because the owner is a know user of the content management system 110;

trust value 1830—1/1 points, because the owner activities do not indicate any copying or pirating or content on other sites;

trust value 1840—0/1 points, because the owner is not affiliated with any entities; and trust value 1850—0/1 points, because the owner has requested a standard license of rights to the work.

Therefore, the content management system 110 follows the multiple operation process (e.g., the "trust ladder") to determine an overall trust value 1860 of 8/10 points for the new digital content item.

Referring back to FIG. 17, in operation 1730, the content management system 110 determines that the trust value calculated from multiple operation authentication processes satisfies a threshold value associated with authenticating the digital content item as authentic. Following the example, the content management system 110 determines the overall trust value of 8/10 is higher than a threshold value of 6/10, and determines the digital content item as authentic.

In some cases, the content management system 110 may modify or set the threshold value based on a number of different factors or contexts. For example, the content management system 110, via the authentication module 1610, may access a price associated with obtaining rights to the digital content item, and determine that the calculated overall trust value satisfies a threshold value that is associated with authenticating the digital content item as authentic and that is based on the price associated with obtaining the rights to the digital content item. For example, a low priced digital content item (e.g., $100) may be determined as authentic when a trust value for the content item satisfies a baseline threshold value (e.g. 6/10), whereas a high priced digital content item (e.g., $10,000) may be determined as authentic when a trust value for the content item satisfies an enhanced threshold value (e.g. 8/10).

In operation 1740, the content management system 110 performs a block chain transaction to register the authentic content item to the content management system, once the content item is determined to be authentic. For example, the ledger module 1240 transfers digital currency between node addresses to register the digital content item, and rights to the content item, to the block chain 1250.

Thus, the content management system 110 may register a digital content item by receiving user input associated with registering the digital content item to the content management system 110, authenticating a digital content item as an authentic content item, and performing a block chain transaction to register the authentic content item to the content management system 110.

Suitable Computing Systems

Figure 19:
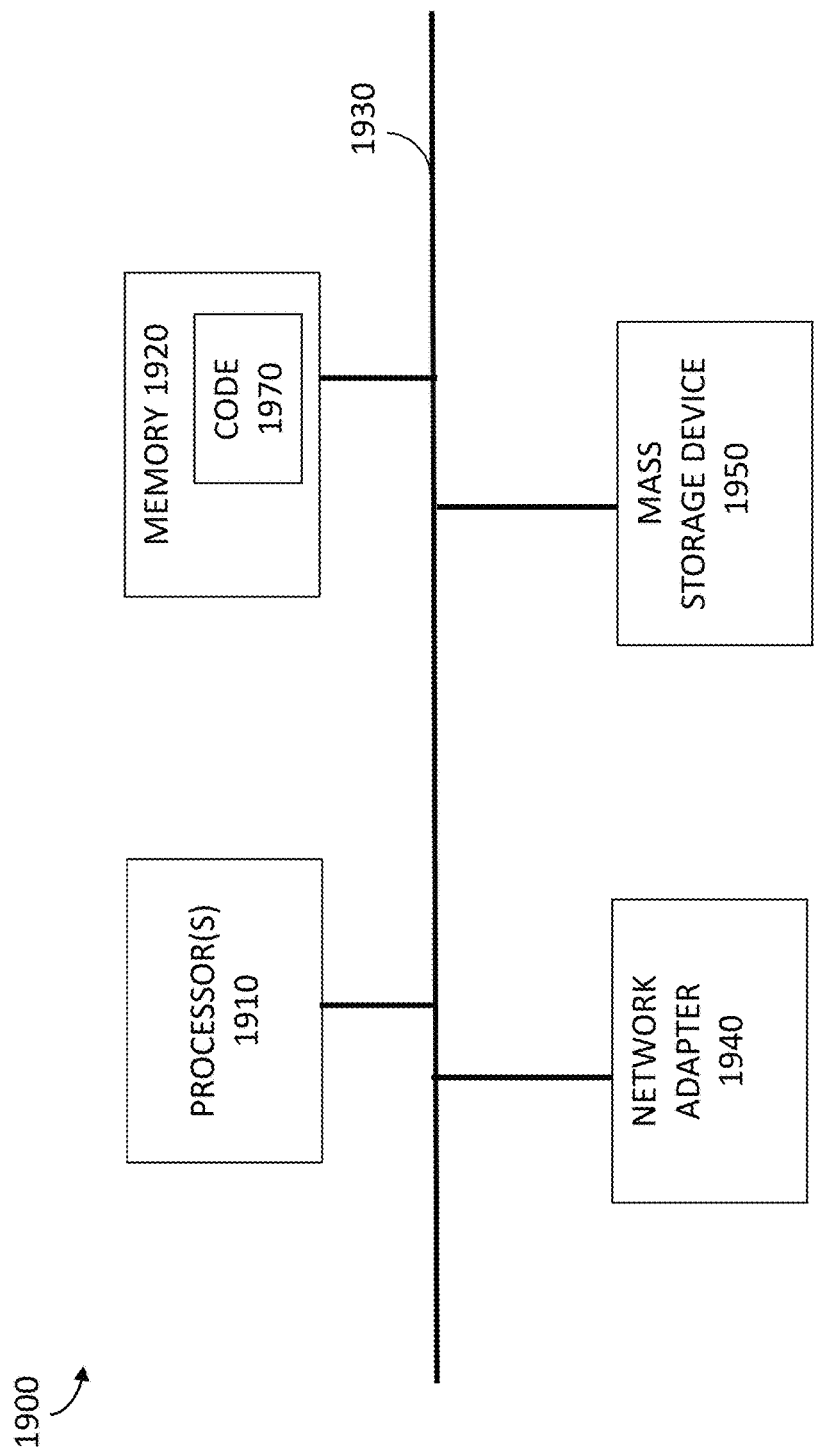
FIG. 19 is a block diagram showing an example architecture of a computer, which may represent any electronic device, any server, or any node within a cloud service, as described herein.

FIG. 19 illustrates a high-level block diagram showing an example architecture of a computer 1900, which may represent any electronic device, such as a mobile device or a server, including any node within a cloud service as described herein, and which may implement the operations described above. The computer 200 includes one or more processors 1910 and memory 1920 coupled to an interconnect 1930. The interconnect 1930 may be an abstraction that represents any one or more separate physical buses, point to point connections, or both connected by appropriate bridges, adapters, or controllers. The interconnect 1930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1910 is/are the central processing unit (CPU) of the computer 1900 and, thus, control the overall operation of the computer 1900. In certain embodiments, the processor(s) 1910 accomplish this by executing software or firmware stored in memory 1920. The processor(s) 1910 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices.

The memory 1920 is or includes the main memory of the computer 1900. The memory 1920 represents any form of random access memory (RAM), read-only memory (ROM), flash memory, or the like, or a combination of such devices. In use, the memory 1920 may contain code 1970 containing instructions according to the techniques disclosed herein.

Also connected to the processor(s) 1910 through the interconnect 1930 are a network adapter 1940 and a mass storage device 1950. The network adapter 1940 provides the computer 1900 with the ability to communicate with remote devices over a network and may be, for example, an Ethernet adapter. The network adapter 1940 may also provide the computer 1900 with the ability to communicate with other computers.

The code 1970 stored in memory 1920 may be implemented as software and/or firmware to program the processor(s) 1910 to carry out actions described above. In certain embodiments, such software or firmware may be initially provided to the computer 1900 by downloading it from a remote system through the computer 1900 (e.g., via network adapter 1940).

CONCLUSION

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

In addition to the above mentioned examples, various other modifications and alterations of the invention may be made without departing from the invention. Accordingly, the above disclosure is not to be considered as limiting, and the appended claims are to be interpreted as encompassing the true spirit and the entire scope of the invention.

The various embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A "computer-readable medium", as the term is used herein, includes any mechanism that can store information in a form accessible by a machine or computer (a machine may be, for example, a computer, network device, cellular phone, personal digital assistant (PDA), manufacturing tool, any device with one or more processors, etc.). For example, a non-transitory machine-accessible or computer-readable storage medium includes recordable/non-recordable media (e.g., read-only memory (ROM); random access memory (RAM); magnetic disk storage media; optical storage media; flash memory devices; etc.), etc.

These computer program instructions may also be stored in a non-transitory computer-readable medium that can direct a computer, other programmable data processing apparatus, or other devices to function in a particular manner, such that the instructions stored in the computer readable medium produce an object of manufacture including instructions which implement the function/act specified in the flowchart and/or block diagram block or blocks.

The computer program instructions may also be loaded onto a computer, other programmable data processing apparatuses, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

We claim:

1. A system for generating a digital contract for rights to a digital content item, the system comprising:
   an input module that receives input associated with transferring rights of a digital content item to a recipient, by providing a user interface that includes multiple user-selectable options associated with rights to be transferred to the recipient, the user-selectable options including:
      a first set of user-selectable options associated with a transaction type for a transfer of rights to the recipient;
      a second set of user-selectable options associated with a type of the digital content item;
      a third set of user-selectable options associated with a version of the digital content item;
      a fourth set of user-selectable options associated with a price for rights to the digital content item; and
      a fifth set of user-selectable options associated with a right to modify the digital content item;
   a transaction module that performs one or more block chain transactions to register each right of the digital content item to transfer to the recipient to a public ledger; and
   a contract module that performs a block chain transaction to register a digital contract that includes information representing each of the performed one or more block chain transactions to the public ledger, including:
      a transfer of digital currency from a parent address node to a child address node associated with registering the digital contract to the block chain, wherein the digital contract includes:
         a first unencrypted portion that includes the information representing each of the performed one or more block chain transactions to the public ledger; and
         a second unencrypted portion that includes a digital fingerprint representing the digital content item;
      an association of data to the transfer of the currency that includes information representing a digital fingerprint of the digital contract; and
      a recording of the transfer of the digital currency from the parent address node to the child address node in the block chain.

2. The system of claim 1, wherein the digital contract is a collection of rights that includes node addresses registered to the public ledger that represent each of the rights to the digital content transferred to the recipient.

3. The system of claim 1, wherein digital contract includes:
   an encrypted portion that includes a plain language version of the rights transferred to the recipient.

4. The system of claim 1, wherein the transaction module performs one or more block chain transactions to register each right of the digital content item to transfer to the recipient to the public ledger by:
   generating an address node as a bitcoin address that represents a right to be provided to a recipient; and
   transferring digital currency from a rightbase to the address node to create the right to the digital content item.

5. The system of claim 1, wherein the transaction module:
   performs a first digital currency transfer transaction between address nodes to register a title of the digital content item;
   performs a second digital currency transfer transaction between address nodes to register a right to transfer the title of the digital content item to a recipient;
   performs a third digital currency transfer transaction between address nodes to register a right to remix the digital content item by a recipient; and
   performs a fourth digital currency transfer transaction between address nodes to register a right to transfer a right to remix the digital content item to a recipient.

6. The system of claim 1, wherein the transaction module:
   performs a first digital currency transfer transaction between address nodes to register a right to transfer the title of the digital content item to a recipient; and
   performs a second digital currency transfer transaction between address nodes to register a right to remix the digital content item by a recipient.

7. A method for generating a digital contract for rights to a digital content item, the method comprising:
   providing a user interface that includes multiple user-selectable options associated with rights of a digital content item to be transferred to a recipient, the user-selectable options including:

a first set of user-selectable options associated with a transaction type for a transfer of rights to the recipient;
a second set of user-selectable options associated with a type of the digital content item;
a third set of user-selectable options associated with a version of the digital content item;
a fourth set of user-selectable options associated with a price for rights to the digital content item; and
a fifth set of user-selectable options associated with a right to modify the digital content item;
receiving input, via the user interface, associated with transferring the rights of the digital content item to the recipient;
performing one or more block chain transactions to register each right of the digital content item to transfer to the recipient to a public ledger; and
performing a block chain transaction to register a digital contract that includes information representing each of the performed one or more block chain transactions to the public ledger by:
transferring digital currency from a parent address node to a child address node associated with registering the digital contract to the block chain, wherein the digital contract includes:
a first unencrypted portion that includes the information representing each of the performed one or more block chain transactions to the public ledger; and
a second unencrypted portion that includes a digital fingerprint representing the digital content item;
associating data to the transfer of the currency that includes information representing a digital fingerprint of the digital contract; and
recording the transfer of the digital currency from the parent address node to the child address node in the block chain.

8. The method of claim 7, wherein the digital contract is a collection of rights that includes node addresses registered to the public ledger that represent each of the rights to the digital content transferred to the recipient.

9. The method of claim 7, wherein digital contract includes:
an encrypted portion that includes a plain language version of the rights transferred to the recipient.

10. The method of claim 7, wherein performing one or more block chain transactions to register each right of the digital content item to transfer to the recipient to the public ledger includes:
generating an address node as a bitcoin address that represents a right to be provided to a recipient; and
transferring digital currency from a rightbase to the address node to create the right to the digital content item.

11. The method of claim 7, wherein performing one or more block chain transactions to register each right of the digital content item to transfer to the recipient to the public ledger includes:

performing a first digital currency transfer transaction between address nodes to register a title of the digital content item;
performing a second digital currency transfer transaction between address nodes to register a right to transfer the title of the digital content item to a recipient;
performing a third digital currency transfer transaction between address nodes to register a right to remix the digital content item by a recipient; and
performing a fourth digital currency transfer transaction between address nodes to register a right to transfer a right to remix the digital content item to a recipient.

12. The method of claim 7, wherein performing one or more block chain transactions to register each right of the digital content item to transfer to the recipient to the public ledger includes:
performing a first digital currency transfer transaction between address nodes to register a right to transfer the title of the digital content item to a recipient; and
performing a second digital currency transfer transaction between address nodes to register a right to remix the digital content item by a recipient.

13. A non-transitory computer-readable medium whose contents, when executed by a computing system, cause the computing system to perform operations, the operations comprising:
performing multiple digital currency transfers between address nodes to register a collection of rights to a digital content item to a block chain,
wherein each digital currency transfer is associated with a separate right of the collection of rights; and
performing a digital currency transfer transaction between address nodes to register the collection of rights to the block chain by:
transferring digital currency from a parent address node to a child address node associated with registering the collection of rights as a digital contract to the block chain, wherein the digital contract includes:
a first unencrypted portion that includes the information representing each of the performed one or more block chain transactions to the public ledger;
a second unencrypted portion that includes a digital fingerprint representing the digital content item; and
an encrypted portion that includes a plain language version of the rights transferred to the recipient;
associating data to the transfer of the currency that includes information representing a digital fingerprint of the digital contract and information representing a contract type for the digital contract; and
recording the transfer of the digital currency from the parent address node to the child address node in the block chain.

* * * * *